US009787895B2

(12) United States Patent
Rekimoto et al.

(10) Patent No.: US 9,787,895 B2
(45) Date of Patent: Oct. 10, 2017

(54) INFORMATION PROCESSING DEVICE, INFORMATION PROCESSING METHOD, AND PROGRAM FOR GENERATING CIRCUMFERENTIAL CAPTURED IMAGES

(71) Applicant: SONY CORPORATION, Tokyo (JP)

(72) Inventors: Junichi Rekimoto, Kanagawa (JP); Shunichi Kasahara, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/906,967

(22) PCT Filed: Dec. 25, 2014

(86) PCT No.: PCT/JP2014/084350
§ 371 (c)(1),
(2) Date: Jan. 22, 2016

(87) PCT Pub. No.: WO2015/122108
PCT Pub. Date: Aug. 20, 2015

(65) Prior Publication Data
US 2016/0301865 A1 Oct. 13, 2016

(30) Foreign Application Priority Data

Feb. 17, 2014 (JP) ................................ 2014-028015
Jun. 18, 2014 (JP) ................................ 2014-125799
Sep. 19, 2014 (JP) ................................ 2014-191990

(51) Int. Cl.
G06F 3/12 (2006.01)
H04N 5/232 (2006.01)
(Continued)

(52) U.S. Cl.
CPC ......... H04N 5/23238 (2013.01); G06F 3/011 (2013.01); G06F 3/012 (2013.01);
(Continued)

(58) Field of Classification Search
None
See application file for complete search history.

(56) References Cited

U.S. PATENT DOCUMENTS

2006/0165395 A1* 7/2006 Shimano .................. G06T 3/608
396/54
2010/0259619 A1* 10/2010 Nicholson ............ H04N 5/2251
348/158
2011/0234584 A1* 9/2011 Endo ..................... G02B 27/017
345/419

FOREIGN PATENT DOCUMENTS

JP 2002-135641 5/2002
JP 2003-284058 10/2003
(Continued)

OTHER PUBLICATIONS

Mar. 24, 2015, Written Opinion of the International Searching Authority for related PCT No. PCT/592014/084350.
(Continued)

Primary Examiner — Kevin McInnish
(74) Attorney, Agent, or Firm — Paratus law Group, PLLC

(57) ABSTRACT

To provide an information processing device, an information processing method, and a program capable of sharing a space while maintaining the degree of freedom of a visual line. An information processing device according to the present disclosure includes: a control unit configured to perform control in a manner that a display image generated based on image information which is generated through imaging of an imaging device mounted on a moving object moving in a space, imaging-device posture information which is information regarding a posture of the imaging device, and user view information which is obtained from a user manipulation device manipulated by a user and speci- (Continued)

fies a region that the user desires to view is displayed in a display region viewed by the user.

12 Claims, 39 Drawing Sheets

(51) Int. Cl.
| | |
|---|---|
| *H04N 5/225* | (2006.01) |
| *H04N 7/18* | (2006.01) |
| *G06F 3/01* | (2006.01) |
| *G06F 3/03* | (2006.01) |
| *G06T 15/20* | (2011.01) |
| *G06T 3/00* | (2006.01) |
| *G06T 3/60* | (2006.01) |
| *G06T 11/60* | (2006.01) |
| *G06F 3/14* | (2006.01) |

(52) U.S. Cl.
CPC .............. *G06F 3/0304* (2013.01); *G06F 3/14* (2013.01); *G06T 3/0062* (2013.01); *G06T 3/60* (2013.01); *G06T 11/60* (2013.01); *G06T 15/205* (2013.01); *H04N 5/225* (2013.01); *H04N 7/185* (2013.01); *G06T 2207/10016* (2013.01)

(56) References Cited

FOREIGN PATENT DOCUMENTS

| | | |
|---|---|---|
| JP | 2006-047748 | 2/2006 |
| JP | 2007-043225 | 2/2007 |
| JP | 2013-110764 | 6/2013 |

OTHER PUBLICATIONS

Jul. 5, 2017, EP communication issued for related EP application No. 14882561.5.

\* cited by examiner

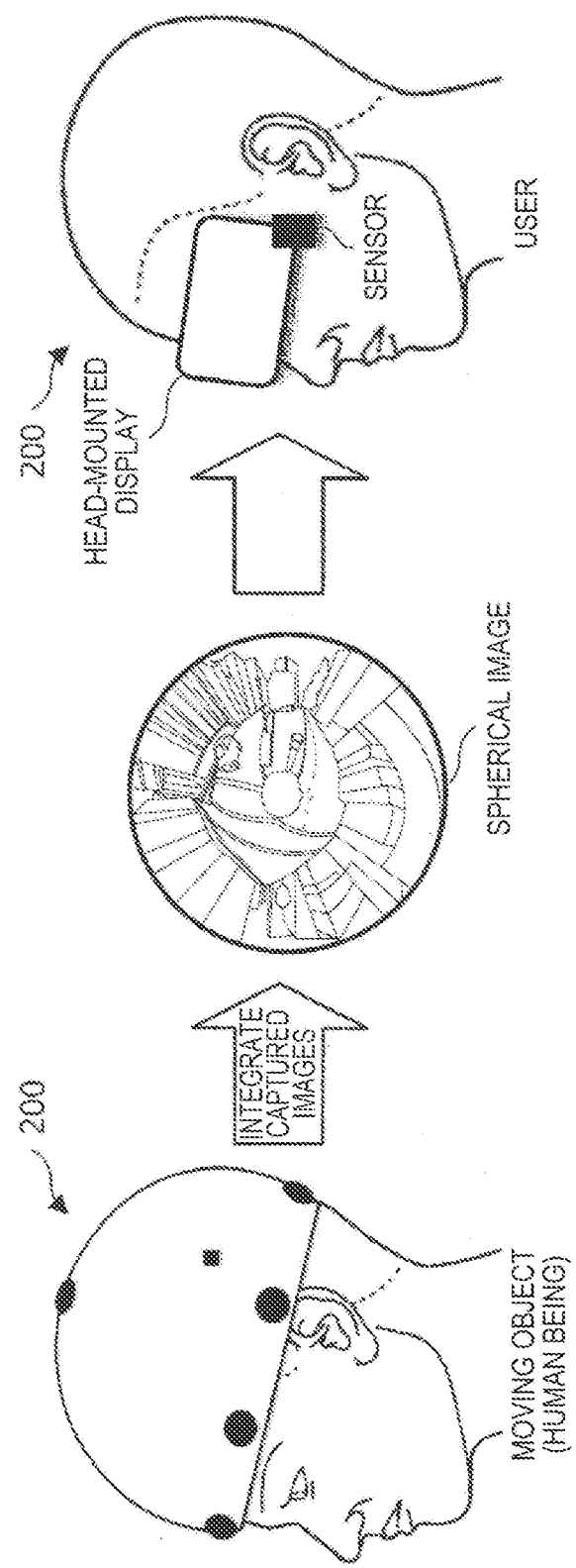

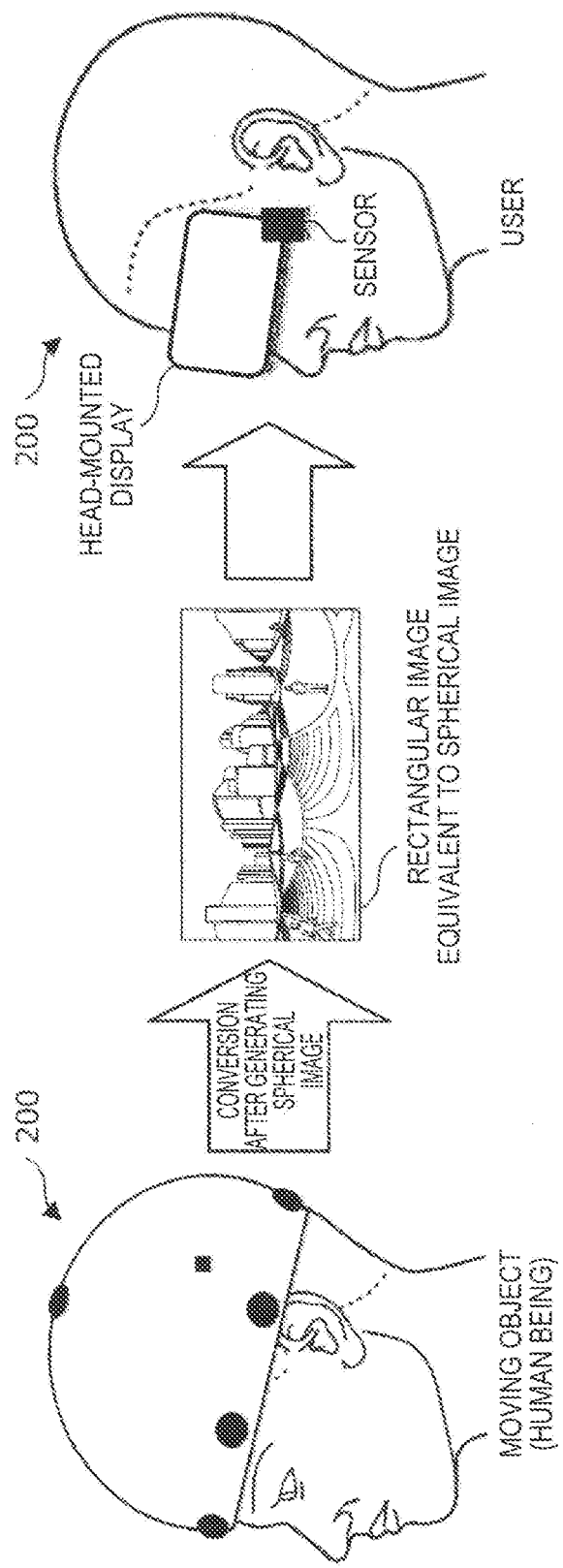

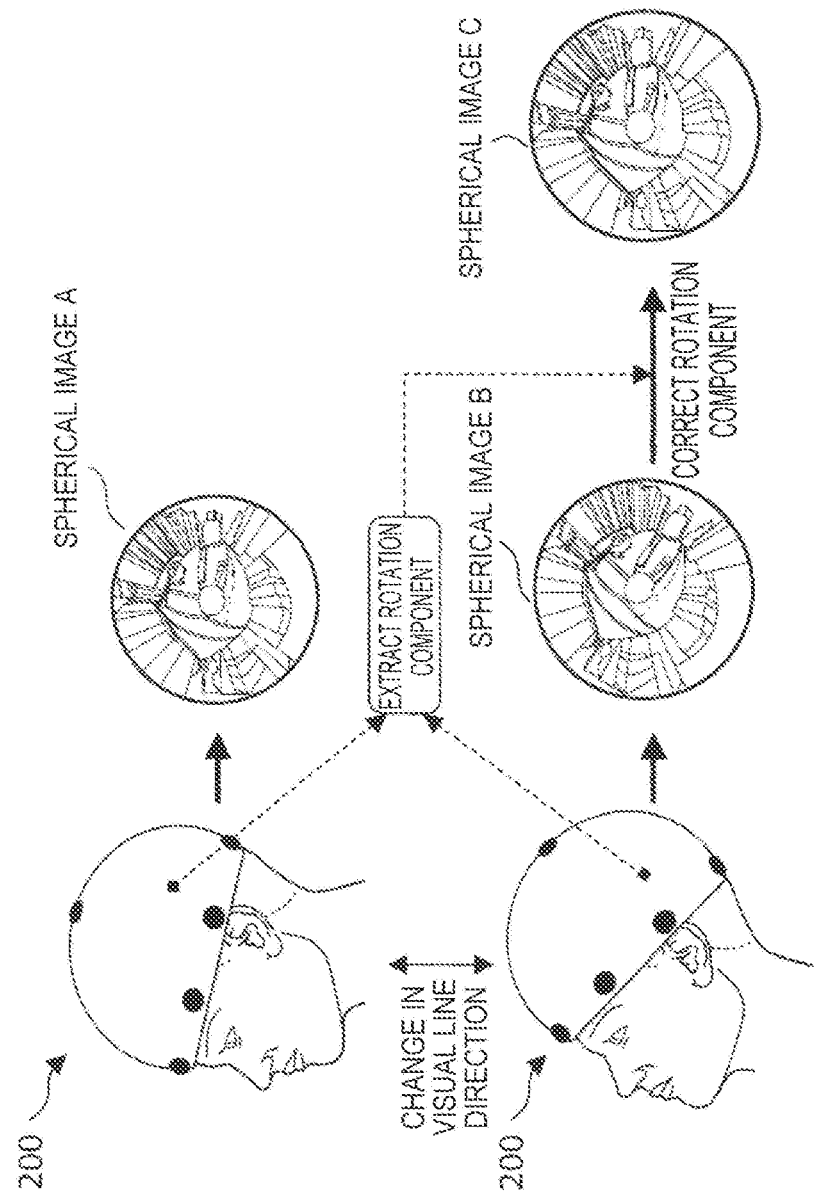

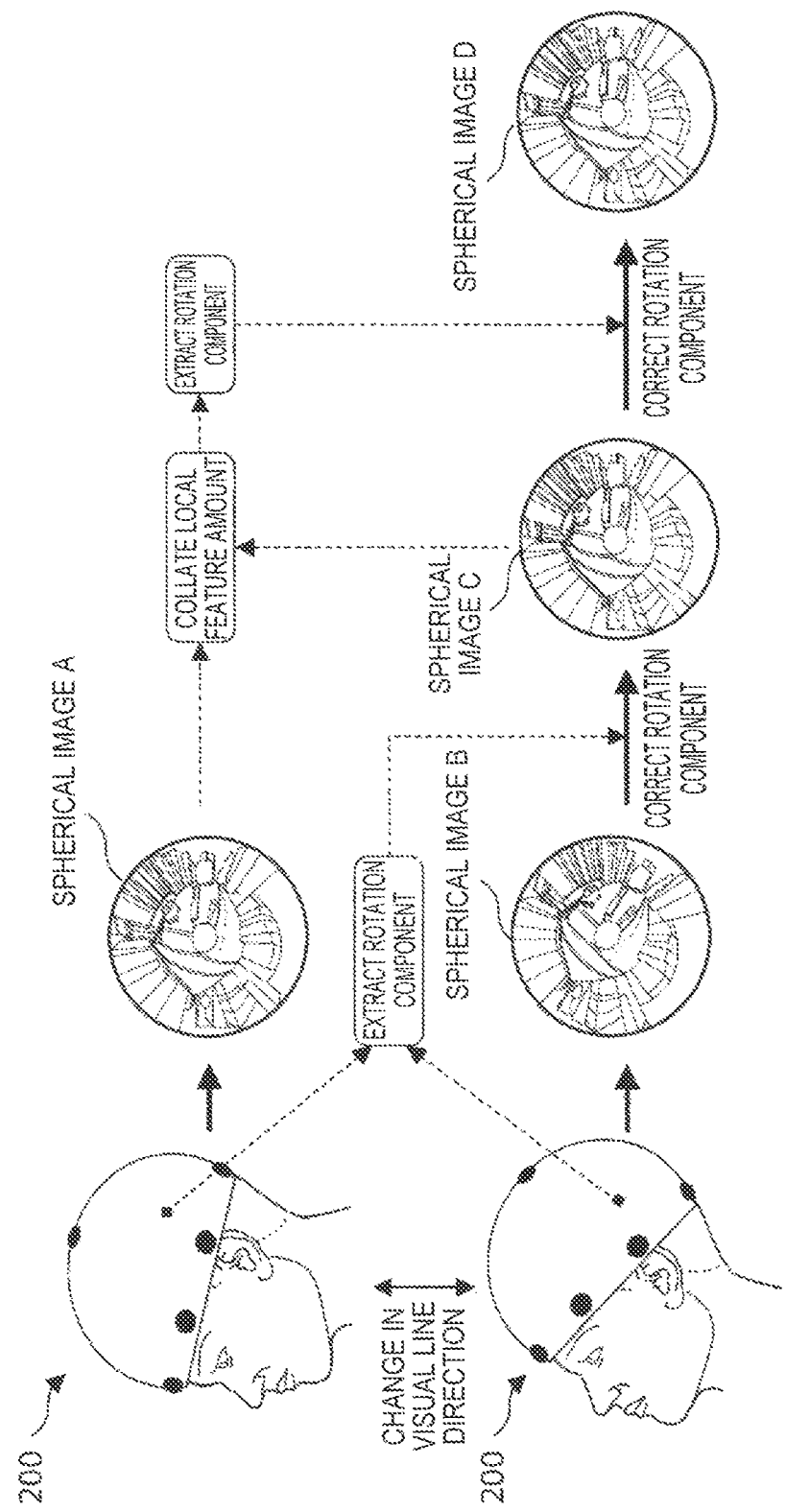

FIG. 9

|  | CORRECTION LEVEL | | |
|---|---|---|---|
|  | CANCEL ROTATION | GRADUALLY FOLLOW ROTATION | NO ROTATION CORRECTION |
| ROTATION AXIS A (yaw AXIS) |  | ✓ |  |
| ROTATION AXIS B (pitch AXIS) |  |  | ✓ |
| ROTATION AXIS C (roll AXIS) | ✓ |  |  |

FIG. 13
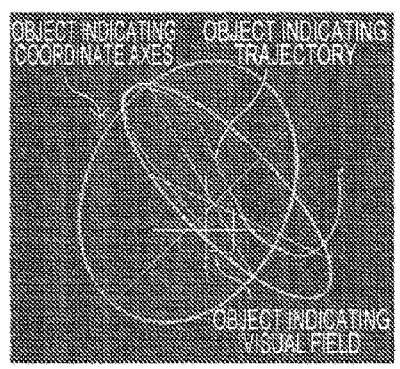
T = t1
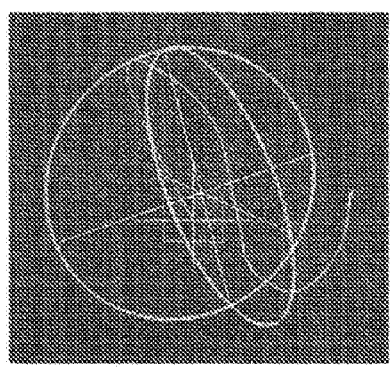
T = t2
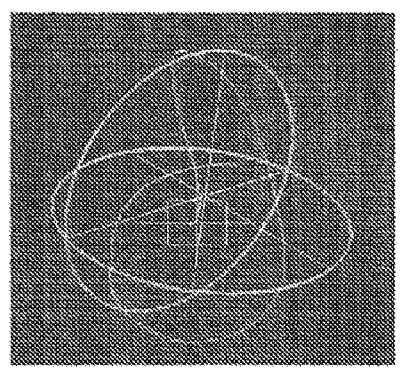
T = t4
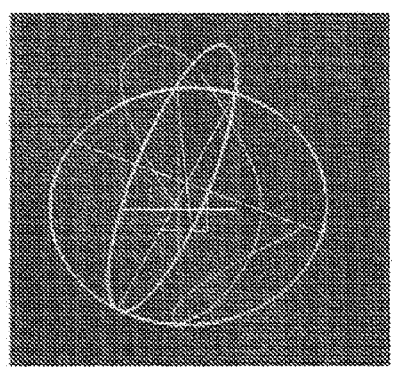
T = t3

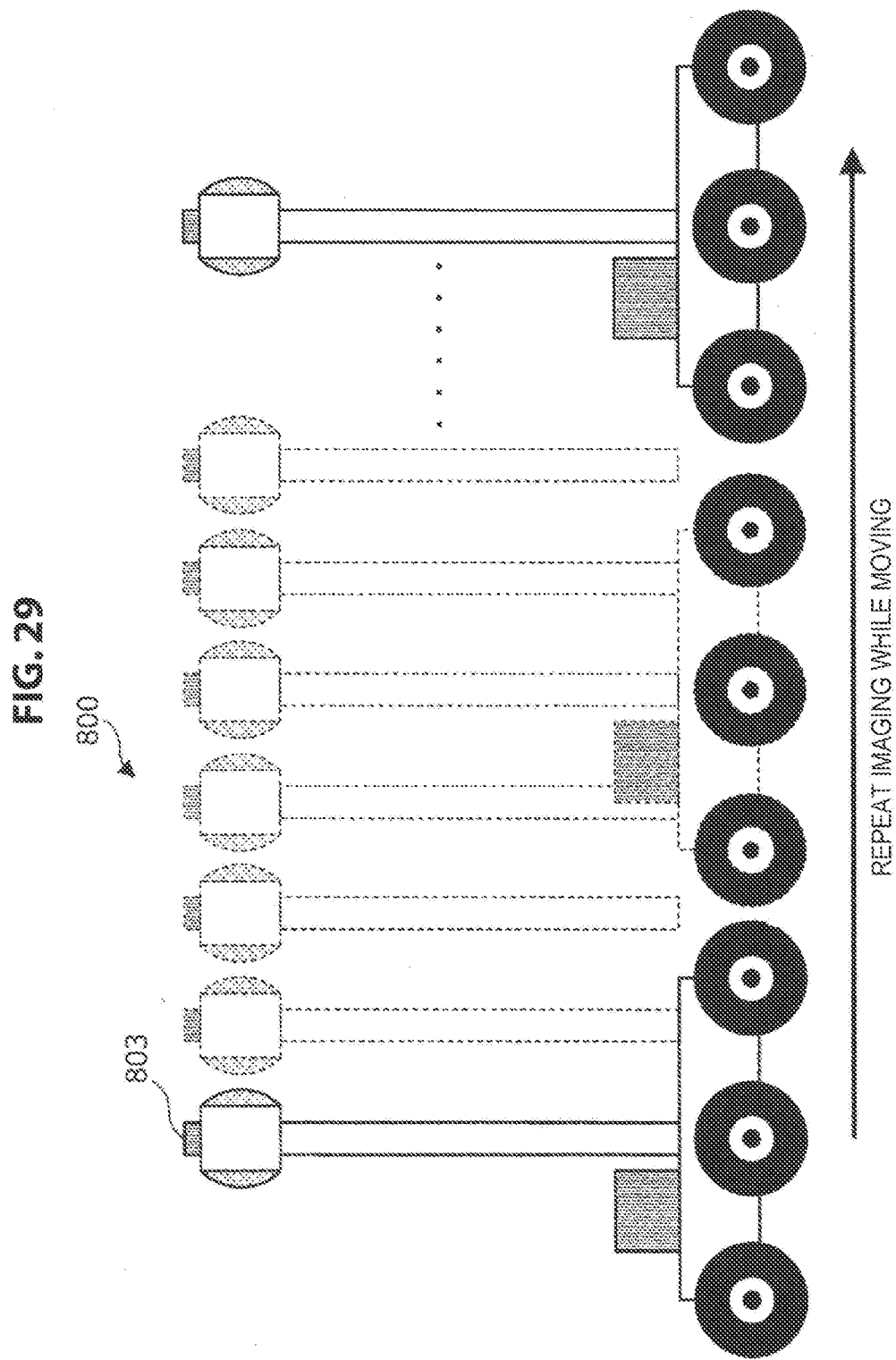

3-DIMENSIONAL IMAGED SPACE IN WHICH LATTICE POINTS
CORRESPOND TO IMAGING POSITIONS AND CAPTURED IMAGES
ARE ASSOCIATED WITH LATTICE POINTS

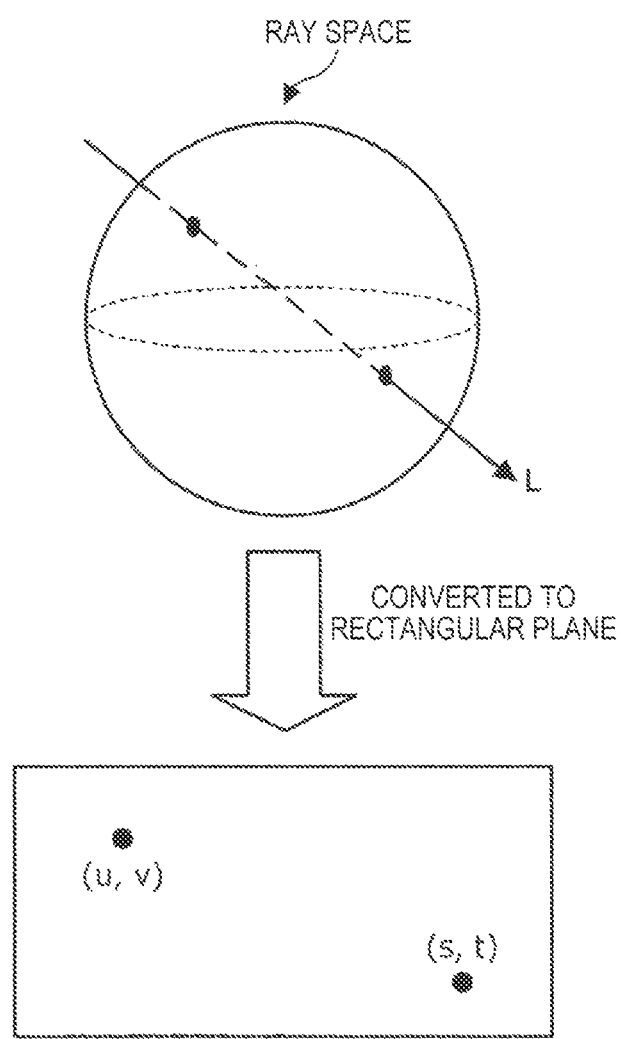

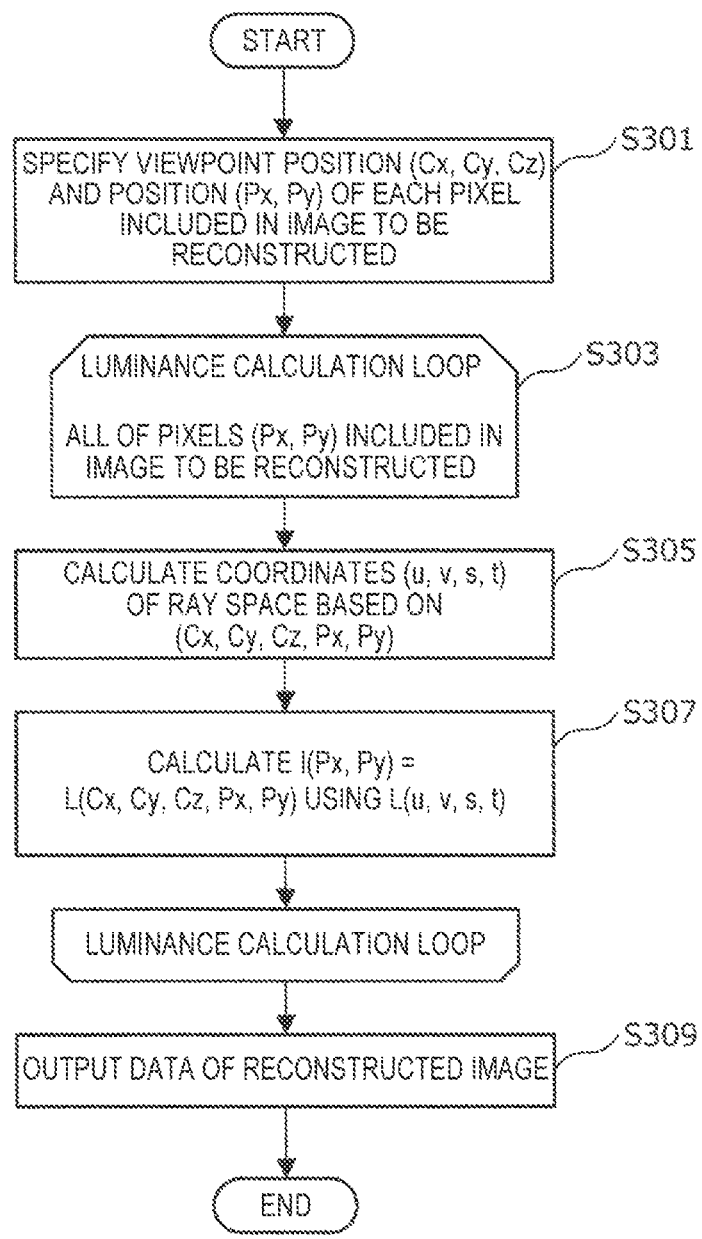

INFORMATION PROCESSING DEVICE, INFORMATION PROCESSING METHOD, AND PROGRAM FOR GENERATING CIRCUMFERENTIAL CAPTURED IMAGES

CROSS REFERENCE TO PRIOR APPLICATION

This application is a National Stage Patent Application of PCT International Patent Application No. PCT/JP2014/084350 (filed on Dec. 25, 2014) under 35 U.S.C. §371, which claims priority to Japanese Patent Application Nos. 2014-191990 (filed on Sep. 19, 2014), 2014-125799 (filed on Jun. 18, 2014), and 2014-028015 (filed on Feb. 17, 2014), which are all hereby incorporated by reference in their entirety.

TECHNICAL FIELD

The present disclosure relates to an information processing device, an information processing method, and a program.

BACKGROUND ART

In recent years, to transfer human experiences to other people as they are, first-person viewpoint images in wearable devices such as head-mounted cameras are used, for example, to generate various kinds of content. Interfaces for sharing experiences with other people or asking other people for knowledge or instructions by realizing communication with the other people through the foregoing transfer of the first-person viewpoint images have been proposed.

For example, Patent Literature 1 discloses a technology for transmitting a video imaged by an imaging device mounted on a head to another device so that the video can be watched with the other device.

CITATION LIST

Patent Literature

Patent Literature 1: JP 2013-110764A

SUMMARY OF INVENTION

Technical Problem

In the technology disclosed in Patent Literature 1, however, since a visual line of another person watching the transferred first-person viewpoint image is restricted to the visual line of a wearer wearing a wearable device, the other person may not comprehend a space from a different viewpoint from the wearer.

Accordingly, it is desirable to provide an information processing device, an information processing method, and a program capable of sharing a space while maintaining the degree of freedom of a visual line.

Solution to Problem

According to the present disclosure, there is provided an information processing device including: a control unit configured to perform control in a manner that a display image generated based on image information which is generated through imaging of an imaging device mounted on a moving object moving in a space, imaging-device posture information which is information regarding a posture of the imaging device, and user view information which is obtained from a user manipulation device manipulated by a user and specifies a region that the user desires to view is displayed in a display region viewed by the user.

According to the present disclosure, there is provided an information processing method including: performing control in a manner that a display image generated based on image information which is generated through imaging of an imaging device mounted on a moving object moving in a space, imaging-device posture information which is information regarding a posture of the imaging device, and user view information which is obtained from a user manipulation device manipulated by a user and specifies a region that the user desires to view is displayed in a display region viewed by the user.

According to the present disclosure, there is provided a program causing a computer to realize a function of: performing control in a manner that a display image generated based on image information which is generated through imaging of an imaging device mounted on a moving object moving in a space, imaging-device posture information which is information regarding a posture of the imaging device, and user view information which is obtained from a user manipulation device manipulated by a user and specifies a region that the user desires to view is displayed in a display region viewed by the user.

Advantageous Effects of Invention

According to the present disclosure described above, it is possible to share a space while maintaining the degree of freedom of a visual line.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 5 is an explanatory diagram for describing a function of the information processing device according to the embodiment.

FIG. 6 is an explanatory diagram for describing a function of the information processing device according to the embodiment.

FIG. 7 is an explanatory diagram for describing a function of the information processing device according to the embodiment.

FIG. 8 is an explanatory diagram for describing a function of the information processing device according to the embodiment.

FIG. 9 is an explanatory diagram for describing a function of the information processing device according to the embodiment.

FIG. 13 is an explanatory diagram for describing a display control process according to the embodiment.

FIG. 29 is an explanatory diagram illustrating a schematic configuration of the imaging device according to the embodiment.

FIG. 32B is an explanatory diagram for describing a function of the information processing device according to the embodiment.

FIG. 35 is a flowchart illustrating a flow example of an information processing method according to the embodiment.

DESCRIPTION OF EMBODIMENTS

Figure 1:
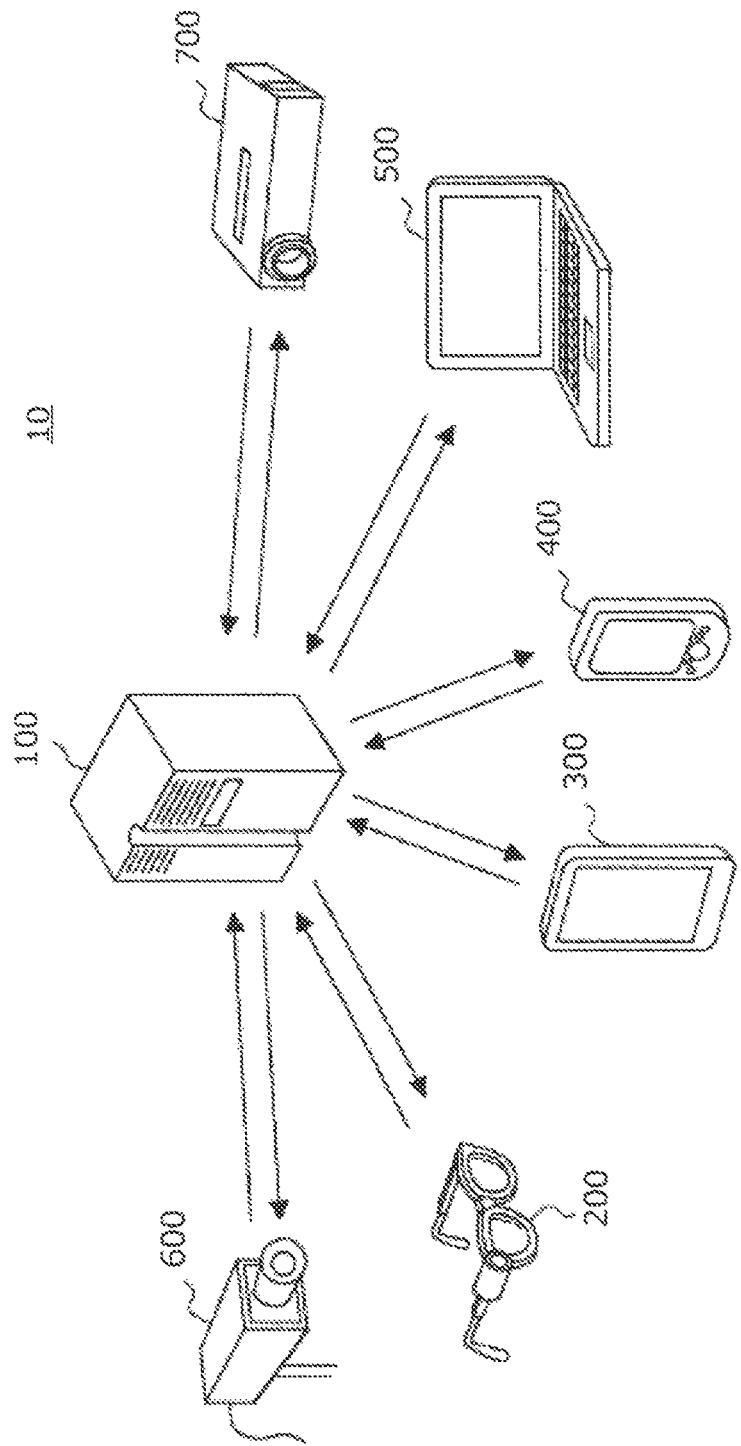
FIG. 1 is an explanatory diagram illustrating a schematic configuration of a system according to a first embodiment of the present disclosure.

Hereinafter, preferred embodiments of the present disclosure will be described in detail with reference to the appended drawings. In this specification and the drawings, elements that have substantially the same function and structure are denoted with the same reference signs, and repeated explanation is omitted.

The description will be made in the following order.
1. First embodiment
1.1 Example of system configuration
1.2 Configuration of information processing device
1.3 Flow of information processing method
1.4 Example of display control process
1.5 Conclusion
2. Second embodiment
2.1 Configuration of information processing device
2.2 Flow of information processing method
2.3 Modification examples of information processing method
2.4 Conclusion
3. Third embodiment
3.1 Example of system configuration
3.2 Configuration of imaging device
3.3 Configuration of information processing device
3.4 Flow of information processing method
3.5 Conclusion First Embodiment <Example of System Configuration>

FIG. 1 is an explanatory diagram illustrating a schematic configuration of a system according to a first embodiment of the present disclosure. As illustrated in FIG. 1, a system 10 according to the embodiment includes a server 100 and clients 200 to 700.

The server 100 is a collective of functions realized by a single server device or a plurality of server devices connected via various wired or wireless networks for cooperation. The server 100 provides various services to the client devices 200 to 700.

The client devices 200 to 700 are terminal devices connected with the server 100 via various wired or wireless networks.

The server 100 and the client devices 200 to 700 independently or cooperatively realize the function of at least one of the following (1) to (7) in the system 10.

(1) A device that includes an imaging mechanism such as a camera and supplies a captured image of the real space to the server 100 or the other client devices 200 to 700.

(2) A device that includes an imaging mechanism such as a camera, performs various kinds of image processing on a captured image of the real space, and supplies various images related to the real space and obtained through the image processing to the server 100 or the other client devices 200 to 700.

(3) A device that includes an imaging mechanism such as a camera, performs various kinds of image processing on a captured image of the real space, generates an image desired by a user according to various manipulations performed on various images by the user, and supplies the generated various images to the server 100 or the other client devices 200 to 700.

(4) A device that includes at least a display mechanism such as a display, preferably further includes a manipulation mechanism such as a touch panel, acquires images supplied by the device (1), generates images desired by a user according to various manipulations performed on the images by the user, and supplies the generated various images to the user for the user to browse.

(5) A device that includes at least a display mechanism such as a display, preferably further includes a manipulation mechanism such as a touch panel, acquires images supplied by the device (2), generates images desired by a user according to various manipulations performed on the images by the user, and supplies the generated various images to the user for the user to browse.

(6) A device that includes at least a display mechanism such as a display, preferably further includes a manipulation mechanism such as a touch panel, acquires images supplied by the device (3) and supplies the images to the user for the user to browse, and receives various manipulations on the images performed by the user.

(7) A device that includes a display mechanism such as a display and displays various images generated based on various user manipulations received by the devices (4) to (6).

The client device 200 is a wearable terminal (hereinafter also simply referred to as the wearable terminal 200). The wearable terminal 200 includes, for example, at least one of an imaging mechanism and a display mechanism and functions as at least one of the devices (1) to (7). In the illustrated example, the wearable terminal 200 is a glasses type terminal and is not limited to this example as long as the wearable terminal 200 has a shape which can be mounted on the body of a user. When the wearable terminal 200 functions as the devices (1) to (3), the wearable terminal 200 includes a camera installed on, for example, a glasses frame as the imaging mechanism. In the wearable terminal 200, the camera can acquire an image of the real space from a position close to the viewpoint of the user. The acquired image is transmitted to the server 100 or the other client devices 300 to 700. When the wearable terminal 200 functions as the devices (4) to (7), the wearable terminal 200 includes a display installed on a part or all of lenses of glasses as the display mechanism. The wearable terminal 200 causes the display to display an image captured by the camera.

The client device 300 is a tablet terminal (hereinafter also simply referred to as a tablet terminal 300). The tablet terminal 300 includes at least a display mechanism, preferably further includes a manipulation mechanism, and can function as the devices (4) to (7). The tablet terminal 300 may further include an imaging mechanism in addition to the display mechanism and the manipulation mechanism and may function as at least one of the devices (1) to (3). That is, the tablet terminal 300 can function as any device among the devices (1) to (7).

The client device 400 is a mobile phone (smartphone) (hereinafter also simply referred to as a mobile phone 400). Since the function of the mobile phone 400 in the system 10 is the same as that of the tablet terminal 300, the detailed description thereof will be omitted. Although not illustrated, for example, a device such as a portable game device, a portable music reproduction device, or a digital camera can function in the same way as the tablet terminal 300 or the mobile phone 400 in the system 10 as long as the device includes a communication mechanism, a display mechanism, and a manipulation mechanism or an imaging mechanism.

The client device 500 is a laptop personal computer (PC) (hereinafter also simply referred to as a laptop PC 500). The laptop PC 500 includes a display mechanism and a manipulation mechanism and functions as the devices (4) to (7). In the illustrated example, since the laptop PC 500 is basically fixed for use, the laptop PC 500 is treated as an example of a device which does not function as the devices (1) to (3). Although not illustrated, for example, a desktop PC or a television can function in the same way as the laptop PC 500. The laptop PC 500 includes a display as a display mechanism, includes a mouse or a keyboard as a manipulation mechanism, displays images supplied directly from the devices (1) to (3) or via various devices, and receives various manipulations performed on the images by the user. When the laptop PC 500 further includes an imaging mechanism such as a camera, the laptop PC 500 can also function as the devices (1) to (3).

The client device 600 is a fixed camera (hereinafter also simply referred to as a fixed camera 600). The fixed camera 600 includes an imaging mechanism and functions as the devices (1) to (3). In the illustrated example, since the fixed camera 600 is fixed for use and does not include a display mechanism, the fixed camera 600 is treated as an example of a device which does not function as the devices (4) to (7). Although not illustrated, for example, when a camera photographing the front of a screen is installed in a desktop PC or a television or when a movable device such as a digital camera is temporarily fixed on a tripod, the device can function in the same way as the fixed camera 600. The fixed camera 600 includes a camera as an imaging mechanism and can acquire an image of the real space from a fixed viewpoint (including a case in which the camera swings automatically or according to a manipulation of the user viewing a captured image).

The client device 700 is a projector (hereinafter also simply referred to as a projector 700). The projector 700 includes a projection device as a display mechanism and functions as the device (7). In the illustrated example, since the projector 700 does not include an imaging mechanism and does not include a manipulation mechanism receiving an input of a displayed (projected) image either, the projector 700 is treated as an example of a device which does not function as the devices (1) to (6). The projector 700 displays various images in the real space by projecting images onto a screen or the surface of an object using a projection device. The projector 700 is illustrated as fixed type projector, but may be a handheld type projector.

The server 100 functions as at least one of the devices (1) to (7) independently or in cooperation with the client devices 200 to 700. That is, the server 100 has a function of acquiring an image of the real space, performing various kinds of image processing on an obtained image, or displaying at least one of the acquired image of the real space or an image obtained through the image processing.

Through the foregoing functions realized by the server 100 and the client devices 200 to 700, the user can view an image of the real space in which a moving object such as any of various life forms such as human beings, a self-propelled object propelling itself on the ground, underground, or underwater, or a flying object flying in the air is present, and thus the space can be shared between any of the various moving objects and the user. In the system according to the embodiment, the user can also freely view an image of the real space in which a moving object is present independently from the moving object by performing a process to be described in detail below.

The system according to the embodiment has been described above. As illustrated in FIG. 1, the system 10 according to the embodiment can include the device capable of acquiring an image of the real space, the device capable of supplying the image of the real space to the user so that the user can view the image of the real space and receiving various manipulations by the user, and the device capable of displaying the image generated through various manipulations by the user.

The server 100 and the client devices 200 to 700 independently or cooperatively perform various kinds of information processing including the above-described image processing performed by the system 10. The server 100 and the client devices 200 to 700 independently or cooperatively realize the information processing device to be described below in detail in terms of the entire system 10.

[Device Configuration]

Figure 2:
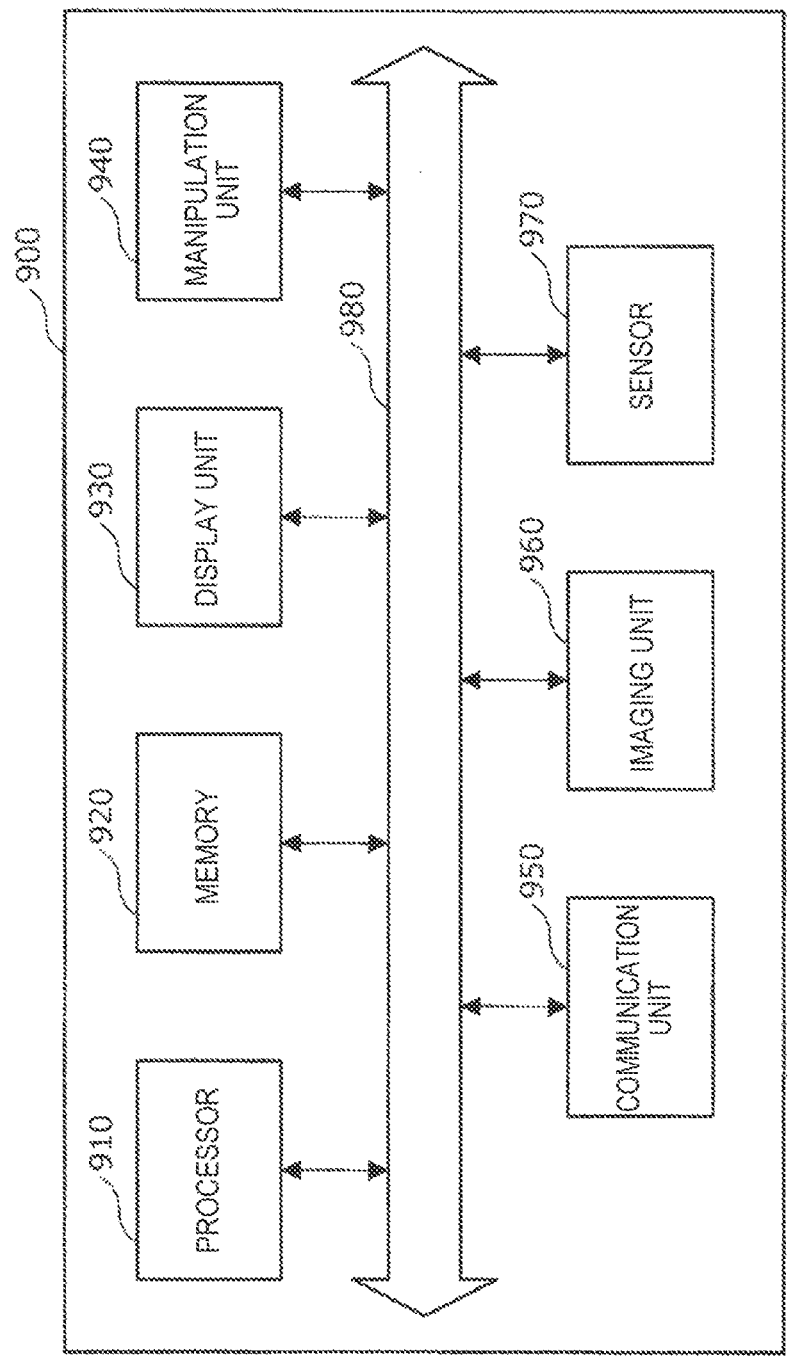
FIG. 2 is an explanatory diagram illustrating a schematic configuration of a device according to the embodiment.

FIG. 2 is an explanatory diagram illustrating a schematic configuration of a device according to the embodiment. As illustrated in FIG. 2, a device 900 includes a processor 910 and a memory 920. The device 900 can further include at least one of a display unit 930, a manipulation unit 940, a communication unit 950, an imaging unit 960, and a sensor 970. These constituent elements are mutually connected by a bus 980. The device 900 can realize, for example, a server device configured as the foregoing server 100 and any of the client devices 200 to 700.

The processor 910 is, for example, any of various processors such as a central processing unit (CPU) or a digital signal processor (DSP) and realizes various functions, for example, by performing operations such as calculation or control according to programs stored in the memory 920. The processor 910 realizes, for example, a control function of any entire device of the server 100 and the client devices 200 to 700. The processor 910 performs, for example, various kinds of image processing to be described below or display control to display an image on a display screen in the server 100 or the client devices 200 to 700.

The memory 920 is configured to include a storage medium such as a semiconductor memory or a hard disk and stores programs or data used for processes by the device 900. The memory 920 may store, for example, captured image data acquired by the imaging unit 960 or sensor data acquired by the sensor 970. Some of the programs and data to be described in the present specification may be acquired from an external data source (for example, a data server, a network storage, or an externally attached memory) without being stored in the memory 920.

The display unit 930 is installed in, for example, a client including the above-described display mechanism. The display unit 930 can be, for example, a display according to the shape of the device 900. For example, in terms of the foregoing example, the wearable terminal 200 can include a display which has a shape corresponding to a lens of glasses or a shape corresponding to a display region of a head-mounted display. The tablet terminal 300, the mobile phone 400, or the laptop PC 500 can include a flat type display installed in each casing. Alternatively, the display unit 930 may be a projection device that projects an image to an object. In the foregoing example, the projector 700 can include a projection device as a display unit.

The manipulation unit 940 is installed in, for example, a client including the above-described manipulation mechanism. The manipulation unit 940 is configured by combining a keyboard, a button, a switch, or the like with a pointing device such as a touch sensor (which configures a touch panel along with a display) installed on the display, a touch pad, or a mouse, as necessary. For example, the manipulation unit 940 receives a manipulation of the user specifying a position inside an image displayed on the display unit 930 by the pointing device and inputting any information at the position with the keyboard, the button, the switch, or the like. Alternatively, the manipulation unit 940 may receive a manipulation of the user specifying a position inside an image displayed on the display unit 930 by the pointing device and inputting any information at the position with the pointing device.

The communication unit 950 is a communication interface which relays communication between the device 900 and another device. The communication unit 950 supports any wireless communication protocol or any wired communication protocol and establishes communication connection with another device.

The imaging unit 960 is a camera module that captures an image. The imaging unit 960 images the real space using an image sensor such as a charge coupled device (CCD) or a complementary metal oxide semiconductor (CMOS) and generates a captured image. A series of captured images generated by the imaging unit 960 configures a video. The imaging unit 960 may not necessarily be included as a part of the device 900. For example, an imaging device connected to the device 900 in a wireless or wired manner may be treated as the imaging unit 960. The imaging unit 960 may include a depth sensor that measures a distance between the imaging unit 960 and a subject for each pixel. Depth data output from the depth sensor can be used to recognize an environment of an image obtained by imaging the real space, as will be described below.

The sensor 970 can include various sensors such as a positioning sensor, an acceleration sensor, and a gyro sensor. A measured result obtained by the sensor 970 may be used for various purposes to support the recognition of the environment of the image obtained by imaging the real space, acquire data specific to a geographical location, or detect a user input. The sensor 970 can be installed in a device including the imaging unit 960 (in the foregoing example, the wearable terminal 200, the tablet terminal 300, the mobile phone 400, or the fixed camera 600, or the like).

<Configuration of Information Processing Device>

Next, the configuration of the information processing device according to the embodiment realized independently or cooperatively by the server 100 and the client devices 200 to 700 described above in terms of the entire system 10 will be described in detail focusing on mainly the functions with reference to FIGS. 3 to 10.

Here, classification of a captured image handled by an information processing device 10 according to the embodiment is not particularly limited, but may be a still image or a moving image.

A captured image handled by an information processing device 1000 according to the embodiment is preferably a captured image obtained by imaging a range of the real space as widely as possible. Accordingly, an imaging device used to image the real space is preferably a camera on which as wide an angle lens as possible is mounted and is more preferably, for example, an omnidirectional camera schematically illustrated in FIG. 3.

Figure 3:
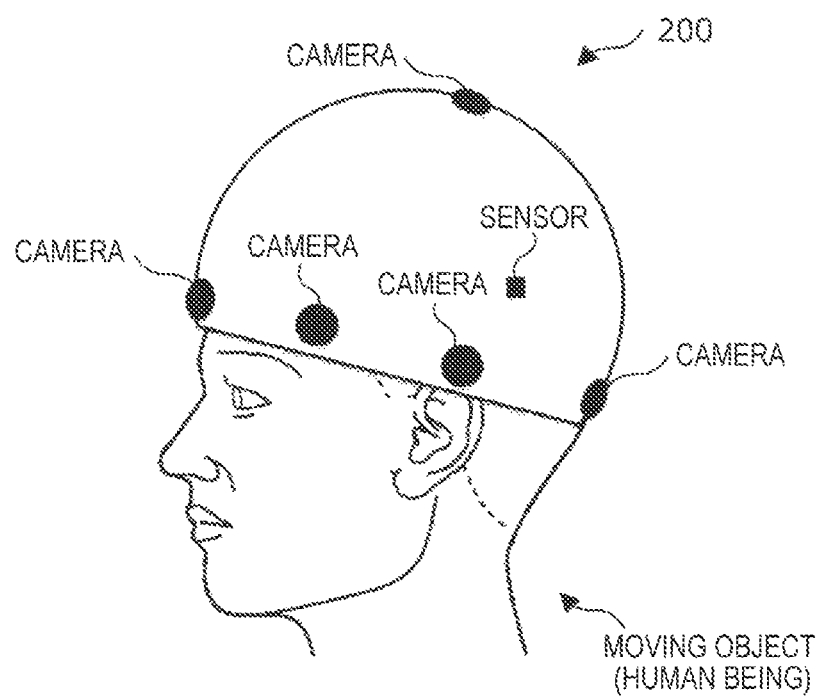
FIG. 3 is an explanatory diagram schematically illustrating an example of a wearable device according to the embodiment.

FIG. 3 schematically illustrates a configuration in which an omnidirectional camera imaging the real space is realized as the wearable terminal 200. In the wearable terminal 200 illustrated in FIG. 3, cameras on which angle lenses that are as wide as possible are mounted are installed in a circular form to surround the circumference of a human head which is an example of a moving object. Even when the cameras are installed in the circumference of the human head, it is difficult to obtain an image in a zenith direction. Therefore, a camera is also installed on the top of the head in FIG. 3. In the wearable terminal 200, various sensors such as a positioning sensor, an acceleration sensor, and a gyro sensor are installed. Information regarding a visual line of the imaging device (in other words, the posture of an imaging device) output from the sensor is output to an information processing device to be described below and is used as posture information of the imaging device which is information regarding the posture of the imaging device in the information processing device.

In the example illustrated in FIG. 3, the case in which the cameras are disposed in the circular form to obtain an omnidirectional image is illustrated.

However, when it is not necessary for an image handled in the information processing device 1000 to be an omnidirectional image, the cameras may not be installed in the circular form and the cameras may be installed at least at parts of the human head. The number of cameras used to implement the wearable terminal 200 illustrated in FIG. 3 is not limited, but the number of cameras may be appropriately set so that an image with a certain wide range can be obtained.

In FIG. 3, the case in which the moving object is a human being is illustrated, but the moving object is not limited to a human being. The moving object may be an animal other than a human being on which the wearable terminal 200 is mounted or may be a self-propelled object such as a robot or a flying object on which cameras are mounted.

The information processing device 1000 that performs various kinds of image processing on a captured image captured by the imaging device exemplified in FIG. 3 is a device that performs control such that a display image generated based on image information generated through imaging by an imaging device mounted on a moving object moving in a space, imaging-device posture information which is information regarding the posture of the imaging device, and user view information which is obtained from the user manipulation device manipulated by the user and specifies a region that the user desires to view is displayed in a display region viewed by the user. The imaging-device posture information may be, for example, information regarding rotation of the imaging device. The user view information may be, for example, information specifying a display field angle that the user desires to view in the omnidirectional image captured by the imaging device.

Figure 4A:
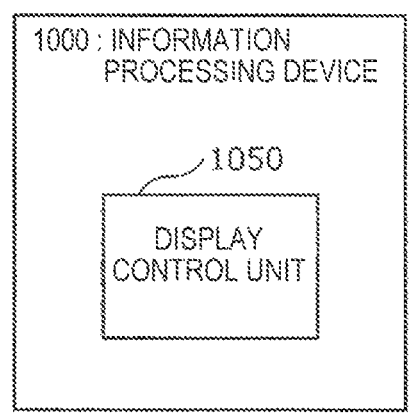
FIG. 4A is a block diagram illustrating an example of the configuration of an information processing device according to the embodiment.
Figure 4B:
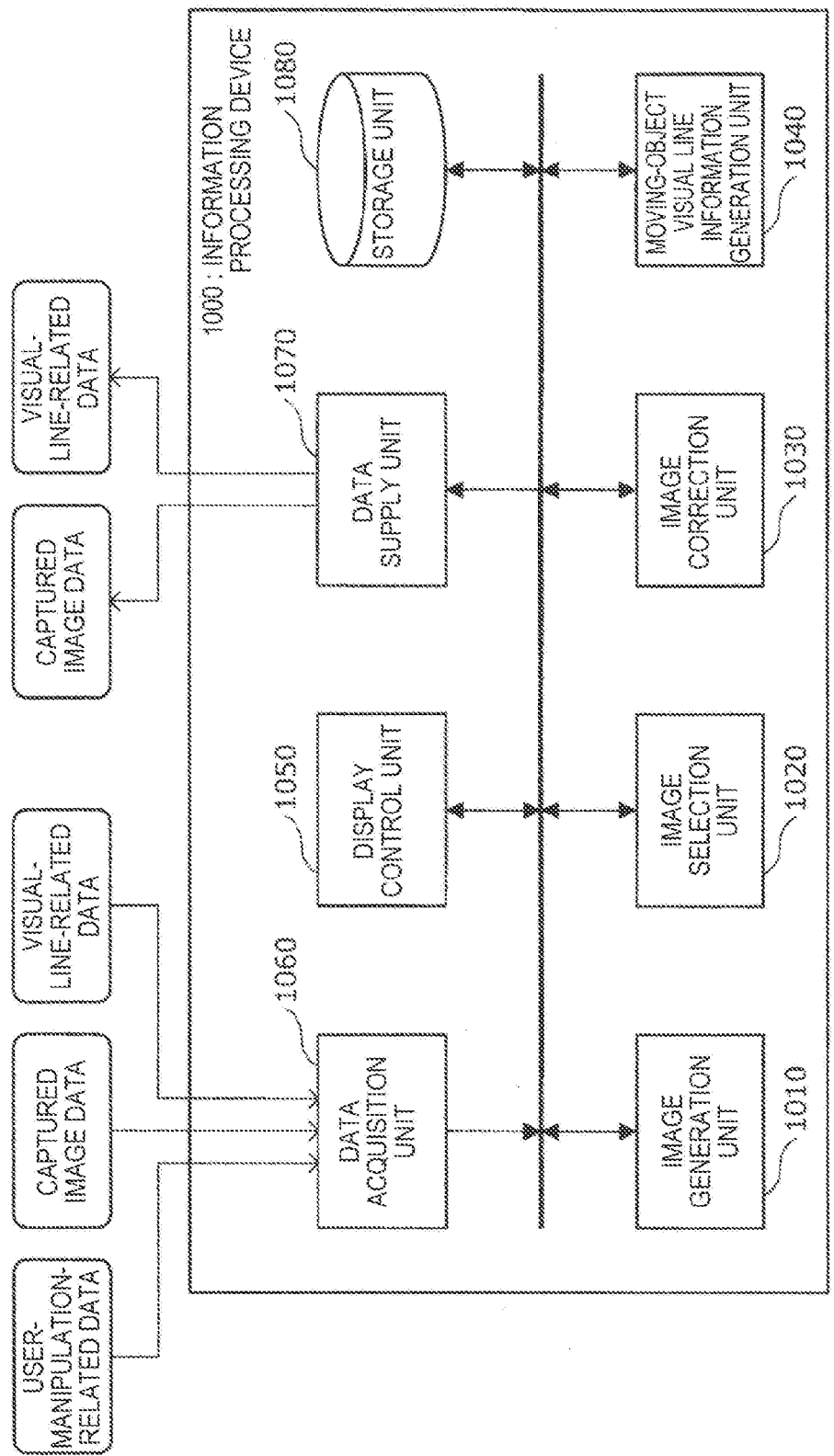
FIG. 4B is a block diagram illustrating an example of the configuration of an information processing device according to the embodiment.

As illustrated in FIG. 4A, for example, the information processing device 1000 includes at least a display control unit 1050 which is an example of a control unit. As illustrated in FIG. 4B, the information processing device 1000 according to the embodiment may further include at least one of an image generation unit 1010, an image selection unit 1020, an image correction unit 1030, a moving-object visual line information generation unit 1040, a data acquisition unit 1060, a data supply unit 1070, and a storage unit 1080 in addition to the display control unit 1050. Here, the processing units illustrated in FIGS. 4A and 4B may be realized in any one of the server 100 and the client devices 200 to 700 or may be distributed to the plurality of devices to be realized.

In the following description, a case in which the information processing device 1000 performs display control on the display image generated based on the imaging-device posture information, the user view information, and the captured image captured by the imaging device will be described. It is needless to say that the information processing device 1000 may perform the display control as follows based on the user view information and generated image (for example, corrected image obtained by performing correction of the posture of the imaging device on the captured image in advance) generated based on the captured image and the imaging-device posture information by the imaging device or devices other than the imaging device and the information processing device.

The image generation unit 1010 generates circumferential captured images which are captured in the circumference of a position at which a moving object moving in a space is present using captured images captured by the imaging device mounted on the moving object. A process of generating the circumferential captured image by the image generation unit 1010 is performed continuously in real time, for example, when the captured images are output from the imaging device illustrated in FIG. 3.

Here, when the captured images to be used to generate the circumferential captured image are captured by the omnidirectional cameras exemplified in FIG. 3, the circumferential captured image generated by integrating the captured images by the image generation unit 1010 is an omnidirectional captured image (spherical image) illustrated in FIG. 5. A scheme of generating a circumferential captured image from a plurality of captured images captured by a plurality of cameras is not particularly limited, but a known scheme may be applied.

The image generation unit 1010 may generate a rectangular image equivalent to the spherical image and illustrated in FIG. 6 as the circumferential captured image, rather than an omnidirectional captured image (spherical image) illustrated in FIG. 5. The rectangular image equivalent to the spherical image can be generated, for example, by converting the spherical image in accordance with a known method such as equidistant cylindrical projection. By using the rectangular image illustrated in FIG. 6 as the circumferential captured image rather than the spherical image illustrated in FIG. 5, it is possible to perform various kinds of image processing more simply.

The image selection unit 1020 selects the captured image corresponding to the user view information as a user view image among the circumferential captured images based on the circumferential captured image generated by the image generation unit 1010 and user view information which is obtained from a user manipulation device manipulated by the user and indicates a space that the user desires to view. The user view image selected by the image selection unit 1020 is supplied to the user manipulation device (for example, the wearable terminal 200 such as a head-mounted display mounted on a different user from a moving object in the examples illustrated in FIGS. 5 and 6) manipulated by the user to be supplied for the user to view. Accordingly, the user manipulating the user manipulation device can share a certain space with the moving object moving in the space and select a position that the he or she desires to view in the space independently from the moving object. As a result, in the space in which the moving object is present, the user can freely select an image at a different position from the position viewed by the moving object.

The generation process for the circumferential captured images and the image selection process from the circumferential captured images can be performed at lower calculation cost than in a space recombination technology in which a process at high calculation cost, such as collation of feature points between images, is frequently used. Accordingly, it is possible to realize downsizing and lightening of the information processing device 1000 capable of performing the process.

Here, the user view information set by the user manipulation device is generated when the user manipulates various input mechanisms such as a touch pad, a keyboard, and a mouse installed in the user manipulation device, and is transferred to the image selection unit 1020. When the user manipulation device is the wearable terminal 200 illustrated in FIGS. 5 and 6, the user view information may be generated by various sensors such as the positioning sensor, the acceleration sensor, and the gyro sensor installed on the wearable terminal 200 automatically detecting a behavior of the user (for example, a visual line direction of the user). The user view information may be generated when the user performs audio input or gesture input to the user manipulation device.

In this way, the information processing device 1000 according to the embodiment includes the image generation unit 1010 and the image selection unit 1020, and thus supplies an image (so-called first-person viewpoint image) of the space viewed by the moving object (more specifically, the imaging device) to the user in real time. Here, in the first-person viewpoint image, considerable screen shake occurs in some cases since the moving object (more specifically, the imaging device) looks in the circumference of a position at which the moving object is present. When the user views the considerable screen shake, the user may feel "nausea" (motion sickness) caused in some cases due to seeing an image with considerable shaking. Accordingly, the information processing device 1000 according to the embodiment preferably has a correction function of correcting the foregoing rotation movement of the imaging device.

The image correction unit 1030 is a processing unit that corrects a change in the image accompanying the above-described rotation movement of the imaging device based on the imaging-device posture information. When the visual line direction of the imaging device is changed without a change in the position of the imaging device (that is, a rotation movement occurs in the imaging device), the image correction unit 1030 performs correction on the circumferential captured image such that a change in the circumferential captured image accompanying the change in the visual line direction of the imaging device is suppressed.

More specifically, the image correction unit 1030 uses moving-object visual line information to perform correction such that the circumferential captured image after the change in the visual line direction of the imaging device is reversely rotated according to the magnitude of a rotation angle accompanying the change in the visual line direction of the imaging device. Hereinafter, this correction process will be described with reference to FIG. 7.

As illustrated in FIG. 7, a spherical image A is assumed to be generated at a certain time in accordance with captured data from the moving object (human being) wearing the wearable terminal 200 which includes the sensors and the omnidirectional cameras. Thereafter, it is assumed that a rotation movement of the imaging device occurs, a change in the visual line direction occurs, and a spherical image B is accordingly generated. In this case, the image correction unit 1030 extracts a rotation component with reference to sensor information output from the wearable terminal 200 and specifies the magnitude of a rotation angle accompanying the change in the visual line direction of the imaging device. Subsequently, the image correction unit 1030 performs the correction on the spherical image B such that the image is reversely rotated according to the obtained magnitude of the rotation angle and generates a spherical image C in which the rotation component is canceled from the spherical image B. Accordingly, as the cancellation result of the rotation component, the spherical image C becomes an image viewed in substantially the same direction as the spherical image A.

By performing the image correction process in this way, it is possible to suppress the considerable screen shake caused due to the rotation movement of the imaging device, and thus it is possible to prevent "nausea" (motion sickness) of the user from occurring.

The image correction unit 1030 may perform a process of correcting the rotation movement so that local feature amounts match before and after the change in the visual line direction accompanying the rotation movement of the imaging device. FIG. 7 illustrates the case in which the rotation correction is performed using the output from the sensor installed in the moving object. However, the correction process for the rotation movement may be performed focusing on the local feature amount in the spherical image A and the local feature amount in the spherical image B.

For example, the image correction unit 1030 extracts the local feature amount (for example, the positions of feature points) in the spherical image A and the local feature amount in the spherical image B and performs a process of collating the local feature amounts. Further, the image correction unit 1030 may perform the correction so that the local feature amounts match before and after the change in the visual line direction of the imaging device. In this case, the image correction unit 1030 may extract the rotation component for matching two local feature amounts and perform the correction on the spherical image B to reversely rotate the image according to the obtained magnitude of the rotation angle.

Here, the local feature amounts focused on by the image correction unit 1030 are not particularly limited, but known local feature amounts can be used. For example, Scale Invariant Feature Transform (SIFT) can be exemplified as the local feature amount.

As illustrated in FIG. 8, the image correction unit 1030 may use the image correction process based on the output from the sensor mounted on the moving object and the image correction process based on the local feature amounts. Accordingly, the image correction unit 1030 can cancel the rotation component more precisely.

The image correction unit 1030 may control the degree to which the correction is performed according to correction application information indicating the application degree of the correction which is obtained from the user manipulation device. Accordingly, the image correction unit 1030 can completely cancel the rotation component through the foregoing rotation component correction or may not correct the rotation component, or can perform correction to an extent at which the rotation component is not completely canceled.

The image correction unit 1030 can also perform image control to gradually follow the rotation movement of the imaging device by performing the correction to an extent at which the rotation component is not completely canceled.

The rotation movement generated in the imaging device can be expressed, for example, using rotation coordinate axes which are defined mutually independently, such as a yaw axis, a pitch axis, and a roll axis. Therefore, the image correction unit 1030 may independently control the degree to which the above-described rotation correction is performed for each of the rotation coordinate axes, for example, as illustrated in FIG. 9.

The moving-object visual line information generation unit 1040 generates visual line information indicating the visual field or the direction (position) of the visual line of the imaging device based on the imaging-device posture information. The visual line information can be generated in accordance with a known direction, for example, using output information (that is, the imaging-device posture information) from the various sensors mounted on the moving object. The visual line information can be supplied to the user along with the circumferential captured image generated by the image generation unit 1010, so that an object indicating the visual field or the direction (position) of the visual line of the imaging device can be displayed in the user view image supplied to the user manipulation device. As a result, the user can comprehend the visual line direction of the imaging device at all times while viewing the circumferential captured image in any direction different from the visual field or the visual line direction (position) of the imaging device.

Figure 10:
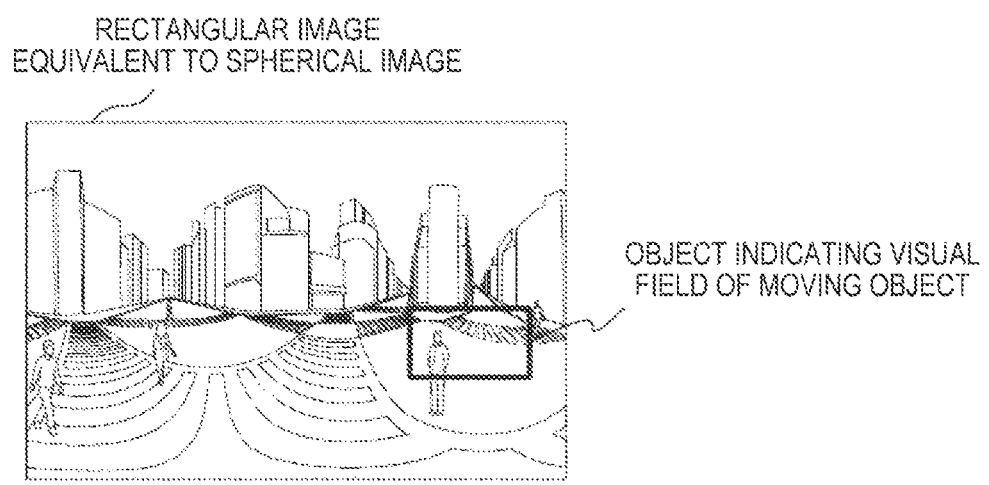
FIG. 10 is an explanatory diagram for describing a function of the information processing device according to the embodiment.

The display control unit 1050 controls display content of a display device such as a display installed in the information processing device 1000 or outside of the information processing device 1000. Specifically, the display control unit 1050 performs control such that a display image which is generated based on the image information generated through the imaging by the imaging device mounted on the moving object moving in the space, the imaging-device posture information which is information regarding the posture of the imaging device, and the user view information which is obtained from the user manipulation device manipulated by the user and specifies the region that the user desires to view is displayed in a display region viewed by the user. The display control unit 1050 can display the object indicating the visual field and the visual line direction of the imaging device inside the user view image by performing display control on the display screen of the user manipulation device, for example, as illustrated in FIG. 10. Accordingly, the user can comprehend the visual line direction of the moving object at all times while selecting the visual line direction independently from the moving object.

The data acquisition unit 1060 acquires captured image data output from the imaging device mounted on the moving object or visual-line-related data including sensor output (that is, the imaging-device posture information) regarding the visual line direction of the imaging device, or acquires data regarding a user manipulation output from the user manipulation device. Various kinds of data acquired from the various devices by the data acquisition unit 1060 can be used appropriately by each processing unit included in the information processing device 1000.

The data supply unit 1070 supplies various kinds of data generated by the information processing device 1000 (for example, captured image data such as the circumferential captured image or the user view image or visual-line-related data such as the visual line direction of the imaging device) to a device installed outside of the information processing device 1000. Accordingly, the device installed outside of the information processing device 1000 can also use the various kinds of information generated by the information processing device 1000.

The storage unit 1080 may appropriately record various databases used for processes of the image generation unit 1010, the image selection unit 1020, the image correction unit 1030, the moving-object visual line information generation unit 1050, the display control unit 1050, the data acquisition unit 1060, and the data supply unit 1070, various programs including applications used for various calculation processes performed by these processing units, and various parameters necessarily stored when certain processes are performed or courses of interim processes.

The storage unit 1080 can be freely accessed by each processing unit such as the image generation unit 1010, the image selection unit 1020, the image correction unit 1030, the moving-object visual line information generation unit 1050, the display control unit 1050, the data acquisition unit 1060, and the data supply unit 1070, so that data can be written or read.

The example of the function of the information processing device 1000 according to the embodiment has been described. The foregoing constituent elements may be configured using general members or circuits or may be configured by hardware specialized for the functions of the constituent elements. All of the functions of the constituent elements may be performed by a CPU or the like. Accordingly, the configurations to be used can be changed appropriately according to technology levels whenever the embodiment is realized.

A computer program for realizing each function of the information processing device according to the above-described embodiment can be created to be mounted on a personal computer or the like. A computer-readable recording medium in which such a computer program is stored can also be supplied. Examples of the recording medium include a magnetic disk, an optical disc, a magneto-optical disc, and a flash memory. The computer program may be delivered via, for example, a network without using a recording medium.

The image generation unit 1010, the image selection unit 1020, the image correction unit 1030, the moving-object visual line information generation unit 1050, the data acquisition unit 1060, the data supply unit 1070, and the storage unit 1080 illustrated in FIG. 4B may also be mounted on another device such as a computer capable of mutually communicating with the information processing device 1000, so that the foregoing functions can be realized in cooperation with the information processing device 1000 and another device.

<Flow of Information Processing Method>

Next, the flow of an information processing method performed by the information processing device 1000 according to the embodiment will be described in brief with reference to FIG. 11.

In the information processing method according to the embodiment, the captured image data is first acquired from the cameras mounted on the moving object (step S101).

Thereafter, the image generation unit 1010 of the information processing device 1000 generates the circumferential captured images for, for example, the spherical image and the rectangular image obtained by converting the spherical image into a rectangular form based on the acquired captured image data (step S103).

At this time, the image correction unit 1030 of the information processing device 1000 performs the foregoing correction process on the generated circumferential captured images, as necessary (step S105).

Thereafter, the image selection unit 1020 of the information processing device 1000 selects an image corresponding to the user view information (that is, the user view image) among the circumferential captured images according to the user view information acquired from the user manipulation device (step S107).

Subsequently, the display control unit 1050 of the information processing device 1000 controls display of the selected image on the display screen of the user manipulation device (step S109). Accordingly, the user using the user manipulation device can share the image in the space in which the moving object is present with the moving object.

Even when the process is performed using a generated image generated based on the captured image and the imaging-device posture information instead of the captured image acquired from the imaging device, the process described above can be performed.

Figure 11:
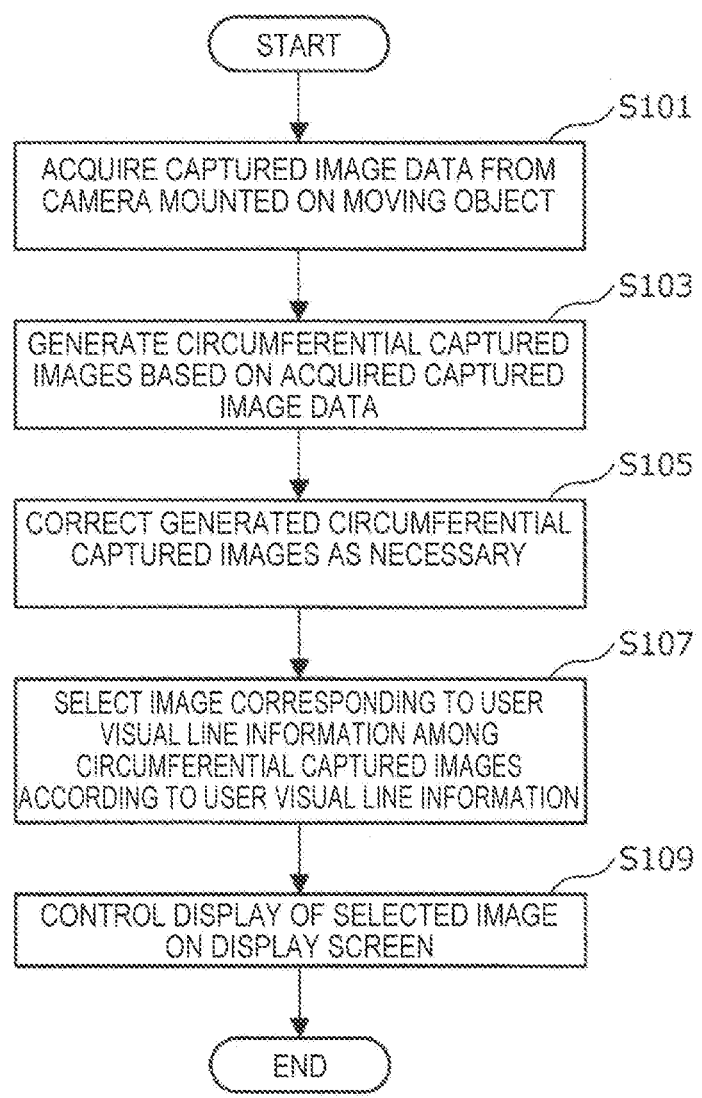
FIG. 11 is a flowchart illustrating a flow example of an information processing method according to the embodiment.

The flow of the information processing method according to the embodiment has been described in brief above with reference to FIG. 11.

<Example of Display Control Process>

Next, a display control process in the display control unit 1050 will be described specifically with reference to FIGS. 12 to 17 exemplifying the display image generated by the display control unit 1050 of the information processing device 1000 according to the embodiment.

FIGS. 12 to 16 are explanatory diagrams for describing the display control process according to the embodiment. FIG. 17 is a flowchart illustrating a flow example of the display control process according to the embodiment.

As described with reference to FIGS. 7 and 8, the information processing device 1000 according to the embodiment can extract the rotation component by focusing on a change between frames of the spherical images generated from the image information continuously output from the imaging device or the rectangular images (that is, the circumferential captured image) which are equivalent to the spherical images and are based on equidistant cylindrical projection.

Here, a rotation movement $Q_{1,2}$ generated between a circumferential captured image $F_1$ corresponding to a frame 1 and a circumferential captured image $F_2$ corresponding to a frame 2 can be specified through a known estimation process or the like performed focusing on locations in the circumferential captured image $F_2$ of the positions of feature points in the circumferential captured image $F_1$. By continuously performing the rotation movement specifying process up to a rotation movement $Q_{N-1,N}$ generated between a circumferential captured image $F_{N-1}$ corresponding to a frame (N−1) and a circumferential captured image $F_N$ corresponding to a frame N to take a product of the obtained rotation movements, it is possible to specify a rotation movement $Q_{1-N}$ from the frame 1 to the frame N as in the following expression 101.

$$Q_{1,N} = Q_{1,2} \times Q_{2,3} \times \ldots \times Q_{N-1,N} \quad \text{(expression 101)}$$

The rotation movement $Q_{1-N}$ obtained in this way can be said to be information regarding rotation accompanying a change in the visual line direction of the imaging device (that is, rotation information). The rotation information can be handled as information indicating a trajectory of the rotation movement generated between the frame 1 to the frame N. The display control unit 1050 visualizes the rotation movement $Q_{1,N}$ and thus can supply the user with the trajectory of the rotation movement generated between the frame 1 to the frame N (in other words, posture information for visualizing a change in the posture of the imaging device).

Here, as coordinate systems available when the display control unit 1050 superimposes the posture information on the display image (that is, the circumferential captured image) generated by the image generation unit 1010, there are the following two coordinate systems:

(a) a coordinate system fixed to the space in which the imaging device is present (an absolute coordinate system: hereinafter also referred to as a coordinate system A); and (b) a coordinate system fixed to the imaging device (a relative coordinate system: hereinafter also referred to as a coordinate system B).

The display control unit 1050 according to the embodiment appropriately displays the circumferential captured image in the space using the coordinate system A between the foregoing two coordinate systems and superimposes various objects or an image corresponding to the posture information on the circumferential captured image.

The display control unit 1050 according to the embodiment may further superimpose various objects or an image corresponding to the posture information on the circumferential captured image subjected to the correction such that the change in the circumferential captured image accompanying the change in the visual line direction of the imaging device is suppressed.

Figure 12:
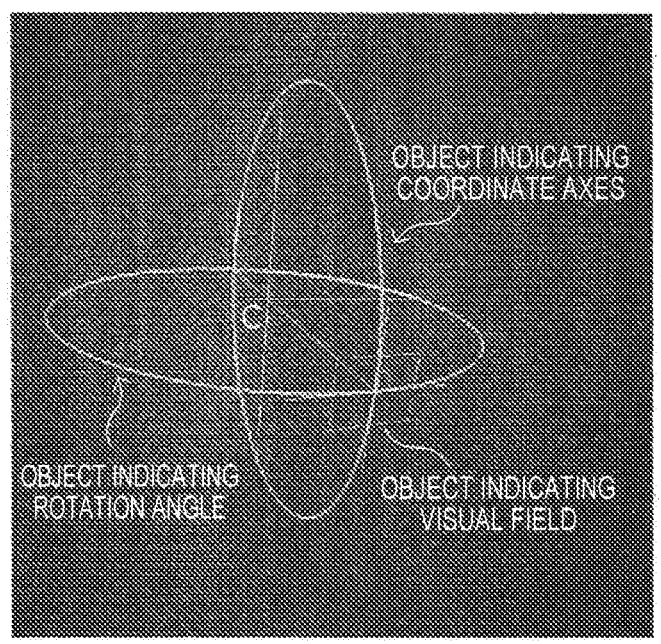
FIG. 12 is an explanatory diagram for describing a display control process according to the embodiment.

The user view image selected from the circumferential captured images by the image selection unit 1020 corresponds to an image seen when a part of the circumferential captured image mapped to the surface of the entire sphere in the coordinate system A schematically illustrated in FIG. 12 is viewed from any point located inside the sphere. Accordingly, apart from the coordinate system A, the coordinate system B is defined at any point located inside the sphere. As illustrated in FIG. 12, the coordinate systems available in the embodiment are preferably rotation coordinate systems that express any position on the surface of the sphere using two rotation angles.

When various annotations such as text data, image data, and audio data are requested to be added to specific positions of the circumferential captured images from the user manipulation device, the display control unit 1050 preferably associates the various annotations with correspondence spots of positions designated from the user manipulation device in the coordinate system A. The display control unit 1050 can also display various objects such as icons or images indicating the annotations at correspondence spots (the correspondence spots in the coordinate system A) of the circumferential captured images according to a position designated from the user manipulation device.

Here, when the information included in the posture information is visualized, at least the following two methods can be used as methods adopted by the display control unit 1050. The display control unit 1050 sets or changes the adopted visualization method based on a user manipulation of at least one of a manipulator of the imaging device and a manipulator of the user manipulation device.

(A) A motion of the coordinate system A is fixed and a motion of the coordinate system B is changed according to the posture information.

In this case, display is realized so that the circumferential captured image displayed in the display region of the display device such as the user manipulation device is changed with the change in the posture of the imaging device. The various objects or the images corresponding to the posture information are displayed so that the various objects or the images are fixed to the display region even when the posture of the imaging device is changed.

(B) A motion of the coordinate system A is changed according to the posture information and a motion of the coordinate system B is fixed.

In this case, even when the posture of the imaging device is changed, the display is realized so that the circumferential captured image displayed in the display region of the display device such as the user manipulation device is not changed or the change in the image accompanying the change in the posture of the imaging device is small. The various objects or the images corresponding to the posture information are displayed in the display region so that the various objects or the images are changed (virtually rotated) with the change in the posture of the imaging device.

Here, the above-described image correction process performed by the image correction unit 1030 corresponds to a process of fixing a motion of the coordinate system B in the foregoing visualization method of (B).

By visualizing the posture information in accordance with the foregoing visualization method of (A), the circumferential captured image fixed to the coordinate system A and the direction of the coordinate system B is changed according to the posture information in the fixed state. To convey the change in the motion of the coordinate system B to the user of the user manipulation device more clearly, the display control unit 1050 may superimpose an object indicating the coordinate axes of the coordinate system B (for example, coordinate axes defined with angles of the latitude direction and the longitude direction) as an object indicating the posture information on the circumferential captured image and may rotate the coordinate axes according to the posture information, for example, as illustrated in FIG. 12. In order to efficiently convey the change in the motion of the coordinate system B to the user of the user manipulation device, the display control unit 1050 may superimpose the motion corresponding to the change in the posture information as a trajectory on the circumferential captured image, for example, as illustrated in FIG. 13.

By visualizing the posture information in accordance with the foregoing visualization method of (B), the direction of the coordinate system B is fixed and the circumferential captured image fixed to the coordinate system A is changed according to the posture information in the fixed state. In this case, since the circumferential captured image is rotated according to the posture information, the user of the user manipulation device can easily comprehend the change in the posture of the imaging device. Here, the display control unit 1050 may superimpose an object indicating the coordinate axes of the coordinate system A (for example, coordinate axes defined with angles of the latitude direction and the longitude direction) on the circumferential captured image and may also rotate the coordinate axes according to the rotation of the circumferential captured image, for example, as illustrated in FIG. 12. In order to efficiently convey the change in the motion of the coordinate system A to the user of the user manipulation device, the display control unit 1050 may superimpose the motion corresponding to the change in the posture information as a trajectory on the circumferential captured image, for example, as illustrated in FIG. 13.

When the display control unit 1050 visualizes the rotation of the two types of coordinate systems described above, the display control unit 1050 can superimpose at least one of an object that is rotated with a rotation movement accompanying the change in the visual line direction of the imaging device and an object that is not rotated on the generated display image (that is, the user view image). That is, the display control unit 1050 rotates the object indicating the coordinate axes of the coordinate system with the rotation movement, but may not rotate an object, for example, a numerical value or a letter given on the coordinate axes illustrated in FIG. 12, which would be difficult to comprehend if the object were rotated with the rotation movement. Accordingly, the position of the object which would be difficult to comprehend if the object were rotated with the rotation movement is moved with the rotation movement, but the posture of the object can be constant from the viewpoint. As a result, it is possible for the user to comprehend the object more easily.

Here, the specific examples of the various objects superimposed on the user view image by the display control unit 1050 are not particularly limited, but any object can be used. It is needless to say that the visual line information illustrated in FIG. 10 may be superimposed on the user view image.

The display control unit 1050 preferably decides or changes the setting regarding which coordinate axes are displayed between the coordinate axes of the coordinate system A and the coordinate axes of the coordinate system B and which coordinate axes are rotated, based on a user manipulation of at least one of the manipulator of the imaging device and the manipulator of the user manipulation device.

When the rotation axes of the coordinate system match the rotation axes of the rotation movement described in the posture information (that is, the rotation movement of the imaging device), it is difficult for the user of the user manipulation device to comprehend the change in the posture of the imaging device in some cases. Accordingly, when the display control unit 1050 visualizes the change in the posture of the imaging device using the rotation information, the display control unit 1050 preferably generates the display image by virtually viewing the space at a different position (for example, a position O from the center of the coordinate system (the coordinate system A) fixed to the space translated from a center C of the coordinate system A in FIG. 12 backward in the visual line direction of the imaging device). Accordingly, the user of the user manipulation device can view a display image just as the display image is generated from a fixed camera installed visually at a different position from the position of the imaging device. As a result, the user of the user manipulation device can more easily comprehend the change in the posture of the imaging device. The display control unit 1050 can set or change a reference position (the position O in FIG. 12) in the foregoing visualization based on a user manipulation of at least one of the manipulator of the imaging device and the manipulator of the user manipulation device.

In order to more efficiently convey the change in the posture information to the user of the user manipulation device, the display control unit 1050 may control at least one of a reproduction speed and a display field angle at the time of the display of the display image in the display region viewed by the user according to the posture information. The display control unit 1050 can more efficiently convey the change in the posture information to the user of the user manipulation device by performing display control such as a reduction in a reproduction speed, for example, at a time point at which a rotation amount based on the posture information is large.

The display control unit 1050 may generate a display image in a case of virtual viewing of the space at an arbitrary position designated from the user manipulation device, centering on the designated arbitrary position, and may supply the display image to the user manipulation device.

[Specific Example of Display Image]

Hereinafter, an example of a display image transferred to the user manipulation device through the display control process performed by the display control unit 1050 according to the embodiment will be described in brief with reference to FIGS. 14 to 16.

Figure 14:
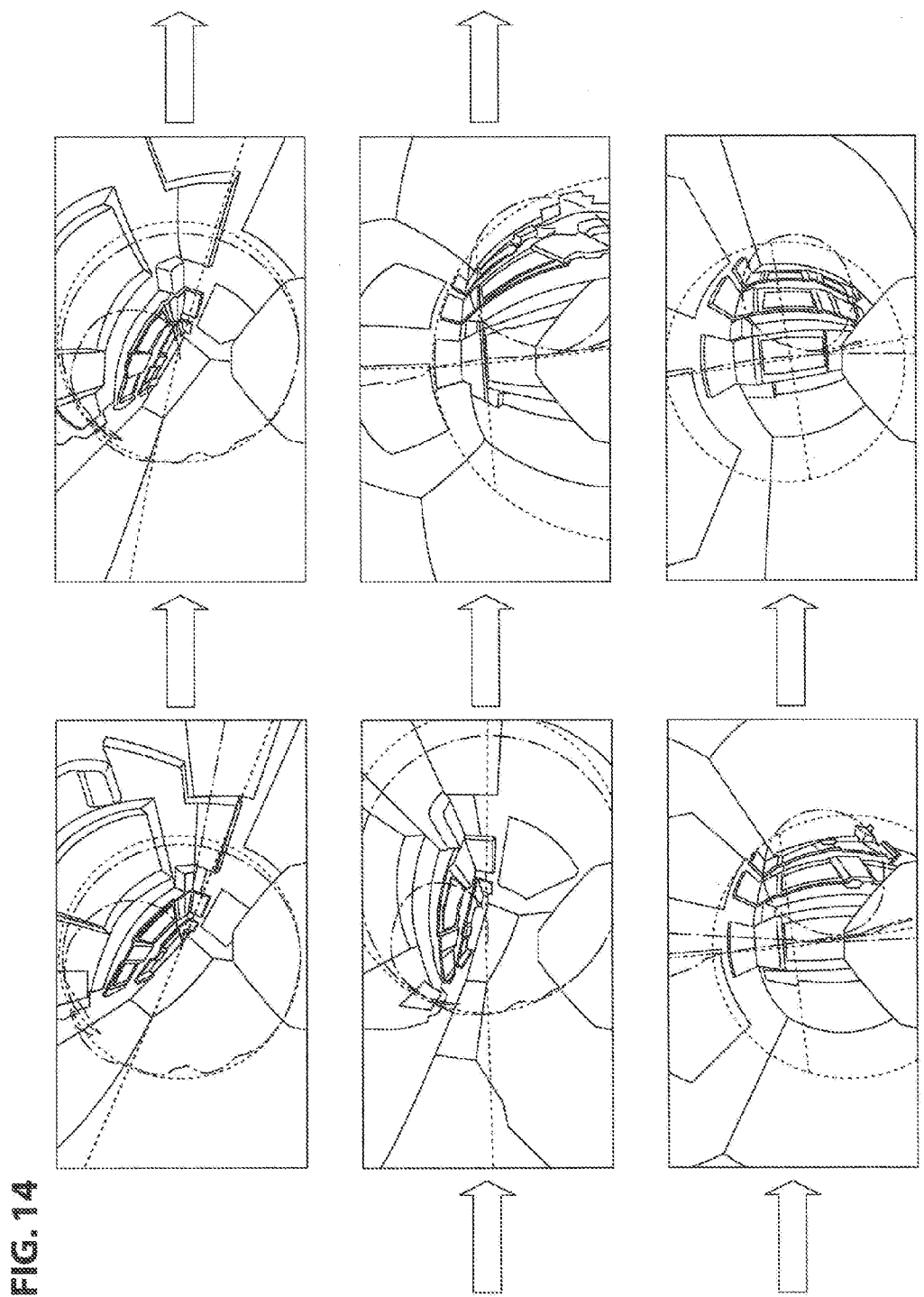
FIG. 14 is an explanatory diagram for describing a display control process according to the embodiment.
Figure 15:
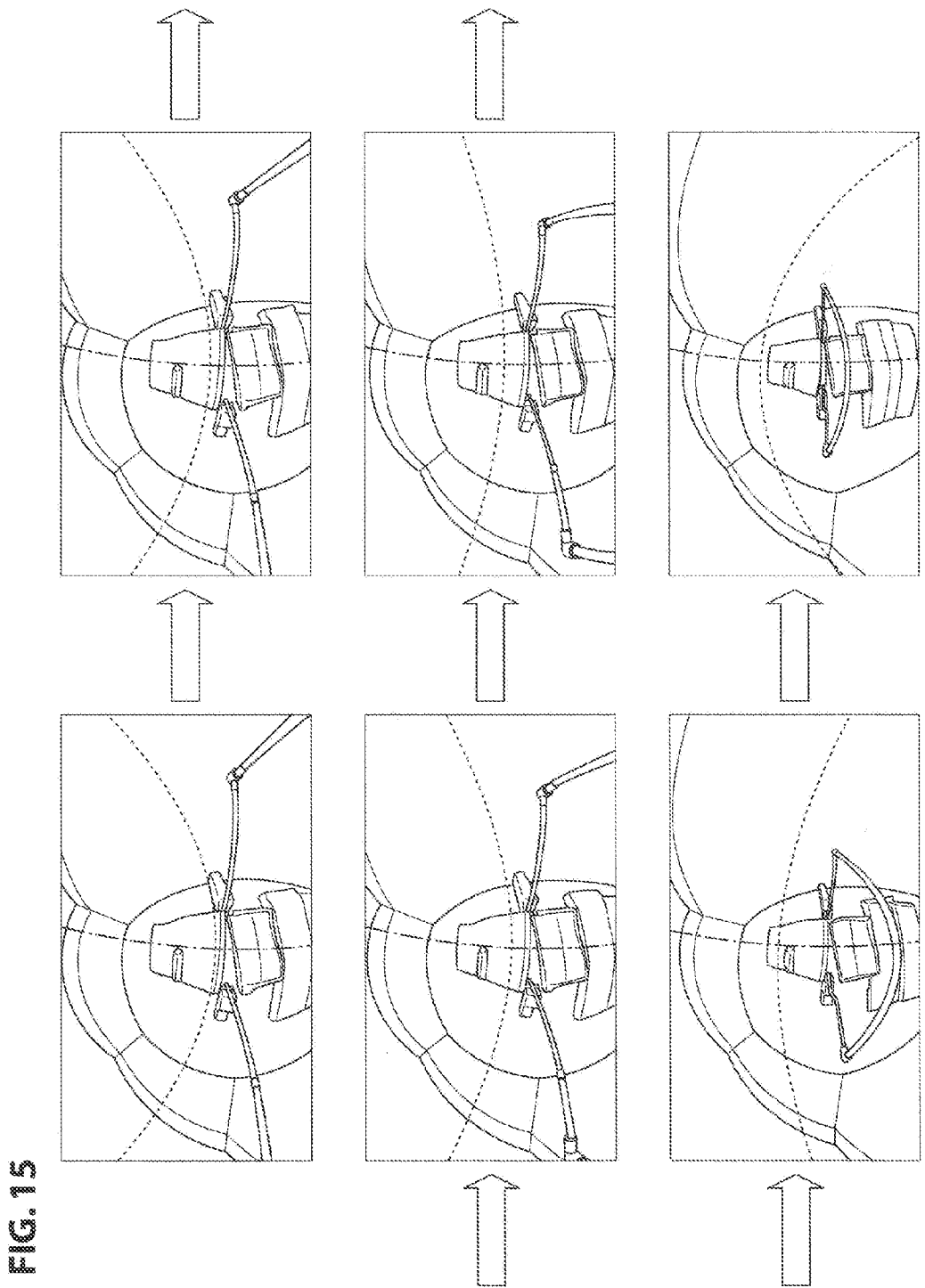
FIG. 15 is an explanatory diagram for describing a display control process according to the embodiment.

FIGS. 14 and 15 to be described below illustrate an example of a case in which images captured by the wearable terminal 200 are supplied to another user manipulating the user manipulation device when the user wearing the wearable terminal 200 on which the imaging device illustrated in FIG. 3 is mounted exercises on a horizontal bar which is one of the gymnastics events in a gymnasium.

FIG. 14 illustrates examples of display images when the foregoing visualization method of (A) is adopted. As apparent from FIG. 14, it can be understood that when the user wearing the wearable terminal 200 continues with the horizontal bar event, circumferential images are changed and the direction of an object indicating the coordinate axes of the coordinate system A is changed moment by moment with the change. In FIG. 14, a trajectory indicating the posture information of the wearable terminal 200 is superimposed on the user view image.

On the other hand, FIG. 15 illustrates an example of a display image when the foregoing visualization method of (B) is adopted. As apparent from FIG. 15, it can be understood that even when the user wearing the wearable terminal 200 continues with the horizontal bar event, circumferential images are not changed and the coordinate axes of the coordinate system B displayed in the superimposition manner are changed moment by moment.

By performing the display control process according to the embodiment in this way, it is possible to visualize the change in the posture of the imaging device using the obtained posture information (the rotation information).

Figure 16:
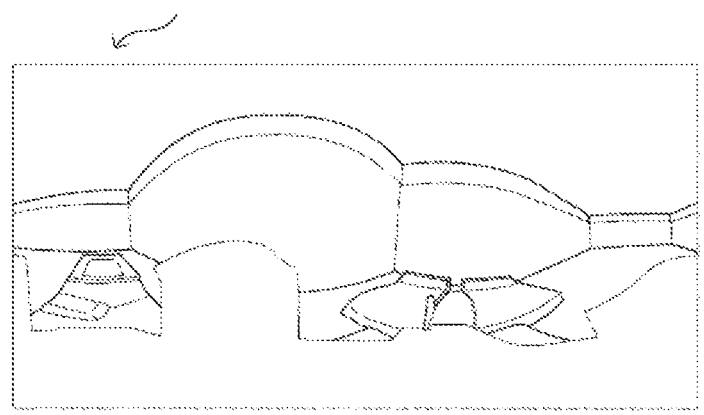
FIG. 16 is an explanatory diagram for describing a display control process according to the embodiment.
Figure 17:
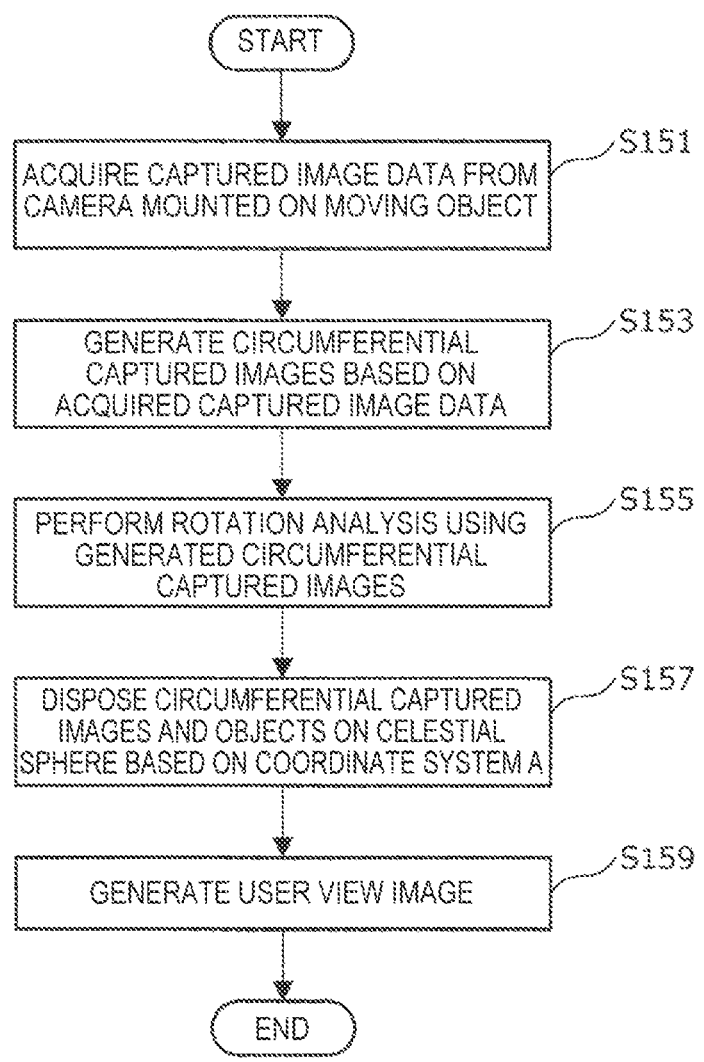
FIG. 17 is a flowchart illustrating a flow example of a display control process according to the embodiment.

The display control process according to the embodiment can be applied not only to the spherical images exemplified in FIGS. 14 and 15 but also to a rectangular image equivalent to the spherical image in accordance with equidistant cylindrical projection, as illustrated in FIG. 16.

[Flow of Display Control Process]

Next, a flow example of the display control process according to the embodiment will be described in brief with reference to FIG. 17.

In the display control process according to the embodiment, captured image data is first acquired from the cameras mounted on the moving object (step S151).

Thereafter, the image generation unit 1010 of the information processing device 1000 generates the circumferential captured images such as the spherical images or the rectangular images obtained by converting the spherical images into a rectangular form based on the acquired captured image data (step S153).

Subsequently, the image correction unit 1030 of the image generation unit 1010 performs the rotation analysis process described above using the generated circumferential captured images (step S155).

Thereafter, the display control unit 1050 of the information processing device 1000 disposes the generated circumferential captured images or various graphic objects on a celestial sphere based on the coordinate system A (step S157).

Subsequently, the image selection unit 1020 of the information processing device 1000 generates an image corresponding to the user view information (that is, the user view image) from the circumferential captured images on which the various graphic objects are superimposed according to the user view information acquired from the user manipulation device (step S159).

The display control unit 1050 of the information processing device 1000 controls the display of the image selected by the image selection unit 1020 on the display screen of the user manipulation device so that the user using the user manipulation device can share the image in the space in which the moving object is present with the moving object.

The flow of the display control process according to the embodiment has been described above in brief with reference to FIG. 17.

<Conclusion>

In this way, in the information processing device and the information processing method according to the embodiment, a video surrounding the moving object can be observed as the circumferential captured images in real time, and thus the user can obtain the sense of presence just as if the user were in the same location as the moving object. By performing the foregoing correction process, the shake of the images caused due to the rotation movement of the moving object is suppressed. Therefore, the user can avoid motion sickness (video sickness) caused due to an abrupt change in the images.

For such a configuration, there are a unilateral case (in which information flows unilaterally from the moving object to the user) and a bidirectional case (in which information is delivered from the user to the moving object through audio and other means). For the former case, for example, when the moving object is assumed to be a sports player, the user is a person watching him or her play, and thus it is possible to realize a sports broadcast in which there is the sense of presence. In this case, the number of users is not limited to one, but tens of thousands of people similar to broadcast listeners can also be considered. On the other hand, for the latter case, a use in which a user gives certain guidance or instructions to a moving object while sharing the visual field of the moving object is assumed. For example, a use in which, when a moving object (person) is cooking, a user gives cooking instructions can be assumed. Even in this case, the number of users is not limited to one, but a relatively smaller number of users is more realistic.

The information processing device and the information processing method according to the first embodiment of the present disclosure will be described in detail.

Second Embodiment

<Configuration of Information Processing Device>

Next, a second embodiment of the present disclosure will be described. An information processing device 1100 according to the embodiment is a device that performs various kinds of information processing on a captured image captured by an imaging device mounted on a moving object which moves so that a user can watch an omnidirectional captured image in the circumference of the moving object more naturally Specifically, as in the first embodiment, the information processing device 1100 according to the embodiment supplies an image (so-called first-person viewpoint image) of a space viewed by a moving object (more specifically, an imaging device) to a user in real time. Here, in the first-person viewpoint image, shake caused due to a motion of the imaged moving object is included. Therefore, when the user views the first-person viewpoint image, the user may feel "nausea" (motion sickness) due to inconsistency of the motion causing the shake included in the first-person viewpoint image and a motion of the body of the user.

Accordingly, in order to reduce the "nausea" felt by the user, a process of extracting the shake of the first-person viewpoint image caused due to the motion of the moving object (more specifically, the imaging device) as a rotation component of the image and correcting the image by reverse rotation of the rotation component is performed. In the foregoing process, however, rotation of the imaging device may also be corrected, for example, when the moving object changes its movement direction. For this reason, when the user watches the first-person viewpoint image of the moving object which moves while changing its movement direction, the first-person viewpoint image is normally oriented in a constant direction, and thus gives an unnatural impression to the user in some cases.

The information processing device 1100 according to the embodiment supplies a more natural first-person viewpoint image to the user by controlling display of the first-person viewpoint image based on a movement direction of the moving object.

The hardware configurations of a system and the information processing device according to the embodiment are substantially the same as the configurations illustrated in FIGS. 1 and 2. A captured image handled by the information processing device 1100 according to the embodiment is preferably, for example, an image which is captured by omnidirectional cameras mounted on the wearable terminal 200 illustrated in FIG. 3 and is obtained by imaging a range of the real space as wide as possible (for example, an omnidirectional captured image).

Hereinafter, the specific functional configuration of the information processing device 1100 according to the above-described embodiment will be described with reference to FIG. 18. Processing units illustrated in FIG. 18 may be realized by any one of the server 100 and the client devices 200 to 700 in FIG. 1 or may be distributed to the plurality of devices to be realized.

Figure 18:
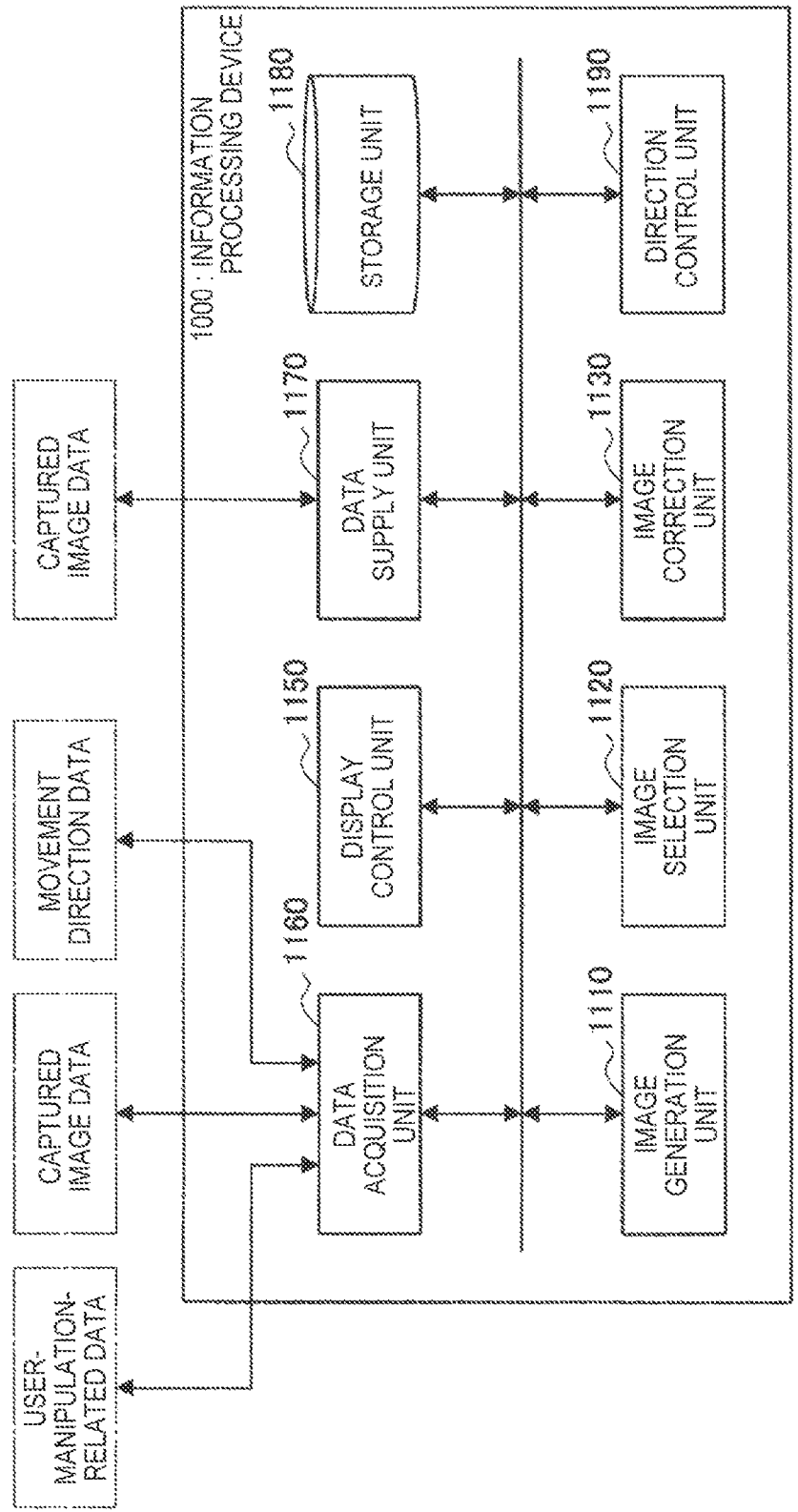
FIG. 18 is a block diagram illustrating an example of the configuration of an information processing device according to a second embodiment of the present disclosure.

As illustrated in FIG. 18, the information processing device 1100 according to the embodiment includes an image generation unit 1110, an image selection unit 1120, an image correction unit 1130, a display control unit 1150, a data acquisition unit 1160, a data supply unit 1170, a storage unit 1180, and a direction control unit 1190.

Here, since the image generation unit 1110 is substantially the same as the image generation unit 1010, the image selection unit 1120 is substantially the same as the image selection unit 1020, the display control unit 1150 is substantially the same as the display control unit 1050, the data acquisition unit 1160 is substantially the same as the data acquisition unit 1160, the data supply unit 1170 is substantially the same as the data acquisition unit 1070, and the storage unit 1180 is substantially the same as the storage unit 1080, the detailed description thereof will be omitted here. Hereinafter, the image correction unit 1130 and the direction control unit 1190 characteristic of the embodiment will be described.

The image correction unit 1130 is a processing unit that corrects a change in an image accompanying rotation of the imaging device by performing reverse rotation to the rotation of the moving object (more specifically, the imaging device) on a circumferential captured image. The image correction unit 1130 may detect the rotation of the imaging device by various sensors such as an acceleration sensor and an inclination sensor and correct a change in the image using the detected rotation. The image correction unit 1130 may estimate the rotation of the imaging device from the circumferential captured images captured by the imaging device and correct the change in the image using the estimated rotation of the imaging device.

The image correction unit 1130 preferably estimates the rotation of the imaging device from the circumferential captured image captured by the imaging device and corrects the change in the image accompanying the estimated rotation of the imaging device. In this case, since the rotation of the imaging device and the rotation correction of the circumferential captured image are easily synchronized and correspondence to higher-speed rotation than when various sensors are used is possible, this is more preferable.

Hereinafter, a method in which the image correction unit 1130 estimates the rotation of the imaging device from the circumferential captured image and corrects the change in the image based on the estimated rotation of the imaging device will be described more specifically with reference to FIG. 19.

Figure 19:
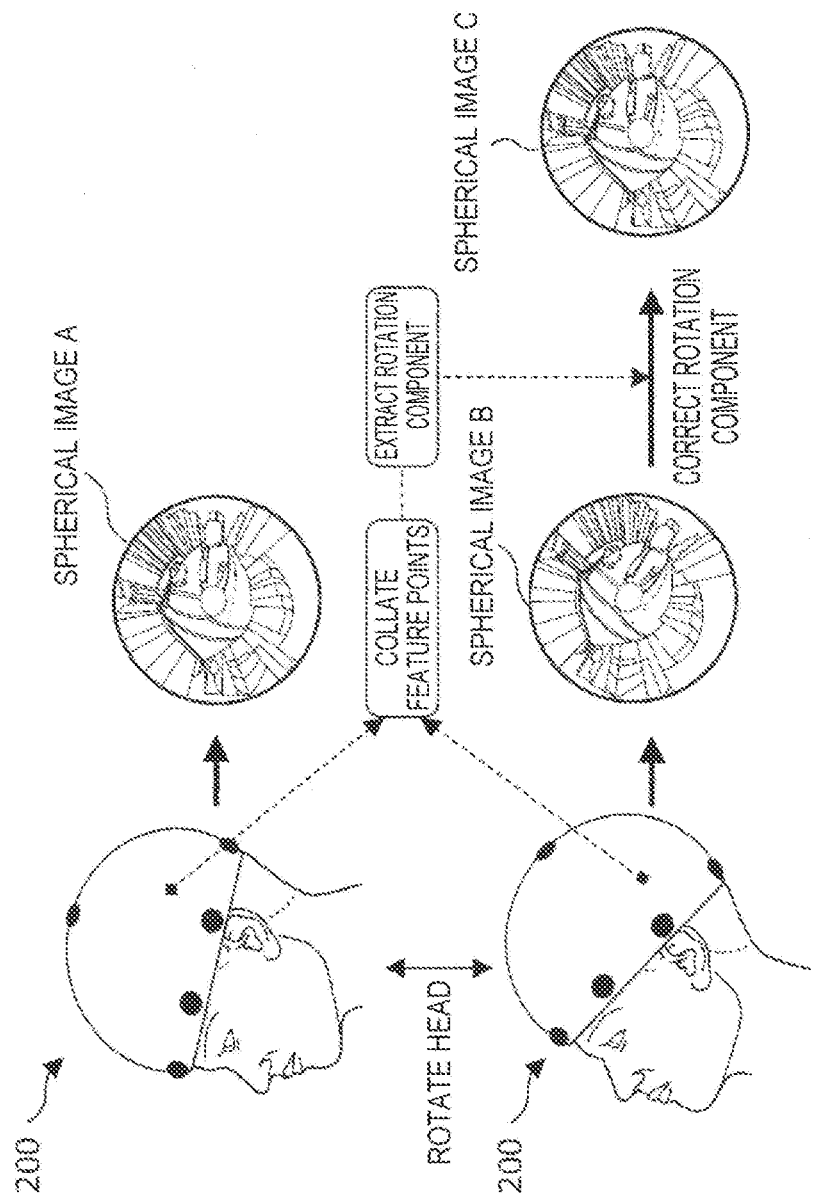
FIG. 19 is an explanatory diagram for describing a function of the information processing device according to the embodiment.

As illustrated in FIG. 19, a spherical image A is assumed to be generated at a certain time (time t) in accordance with imaged data from a moving object (human being) wearing the wearable terminal 200 including the omnidirectional cameras. Thereafter (at time t+1), it is assumed that a rotation movement is generated in the moving object (more specifically, the imaging device) and a spherical image B is generated.

In this case, the image correction unit 1130 extracts local feature amounts U from the spherical images A and B and calculates change amounts F of the local feature amounts. Specifically, the image correction unit 1130 extracts the positions of a plurality (for example, n=1000) of image feature points as the local feature amounts U from the spherical image A and the spherical image B.

Here, the plurality of image feature points are preferably extracted at intervals that are as uniform as possible in the entire spherical images. Since distortion of the images tends to increase in high-latitude portions of the spherical images, the image feature points are preferably not extracted from the high-latitude portions.

Next, the local feature amounts U extracted in the spherical images A and B are compared to calculate the change amounts F of the local feature amounts at the time of the change from the spherical image A to the spherical image B. Of the change amounts F of the local feature amounts, the change amounts equal to or greater than a predetermined threshold value may be excluded as deviant values.

That is, a local feature amount U(t+1) in the spherical image B at time t+1 can be expressed in the following expression 201 using a local feature amount U(t) in the spherical image A at the immediately previous time t and a change amount F(t+1) of the local feature amount between the spherical images A and B.

[Math. 1]

$$U(t+1)=U(t)+F(t+1) \quad \text{(expression 201)}$$

Next, the image correction unit 1130 converts the local feature amounts (U(t), U(t+1)) calculated by mapping the spherical images A and B to a celestial sphere of equidistant cylindrical projection into 3-dimensional feature amounts P(t) and P(t+1). Subsequently, the image correction unit 1130 estimates conversion Mat(t+1) from the 3-dimensional feature amounts P(t) to P(t+1) through 3-dimensional affine estimation.

[Math. 2]

$$P(t+1)=P(t) \times Mat(t+1) \quad \text{(expression 202)}$$

Accordingly, the image correction unit 1130 can estimate the conversion Mat(t+1) from P(t) to P(t+1). Further, the image correction unit 1130 can calculate rotation Q(t+1) from the spherical image A to the spherical image B based on the estimated conversion Mat(t+1). The image correction unit 1130 may determine whether the estimation of the rotation succeeds by calculating an estimation error of the calculated rotation Q(t+1). The image correction unit 1130 may estimate the rotation again when the image correction unit 1130 determines that the estimation fails.

Accordingly, the image correction unit 1130 can generate a spherical image C in which the rotation is corrected by performing rotation subjected to reverse conversion of the estimated rotation Q(t+1) on the spherical image B. The image correction unit 1130 may integrate the rotation from the spherical image at a predetermined time and correct the circumferential captured image based on the integrated rotation.

The local feature amounts focused on by the image correction unit 1130 are not particularly limited, but known local feature amounts can be used. As the known local feature amounts, for example, Scale Invariant Feature Transform (SIFT) or the like can be exemplified.

The direction control unit 1190 is a processing unit that controls the display of the circumferential captured image based on a movement direction of the moving object. Specifically, the direction control unit 1190 controls a display image displayed in a display region viewed by the user so that the reference direction of the display image viewed by the user matches the movement direction of the moving object. More specifically, when an angle difference between the moving direction of the moving object and the reference direction of the moving object is within a threshold value (for example, 15° to either side for a total of 30°), the direction control unit 1190 controls a display field angle of the image displayed in the display region viewed by the user so that the reference direction of the display image viewed by the user matches the reference direction or the movement direction of the moving object.

Here, the reference direction of the moving object is, for example, a front direction of the moving object (a human being, a self-propelled object, a flying object, or the like). The reference direction of the display image viewed by the user is, for example, a field angle direction of the display image displayed in the display region in front of the user when the user faces in the front direction.

That is, the direction control unit 1190 can control the display field angle of the display image so that the front direction of the moving object matches the field angle direction of the display image displayed in the display region in front of the user when the user faces in the front direction. Therefore, the direction control unit 1190 can resolve unnaturalness of the display image occurring when the moving object changes its movement direction.

For example, the direction control unit 1190 may calculate the movement direction of the moving object from positional information of the moving object acquired through positioning using the Global Positioning System (GPS) or Wi-Fi (registered trademark). For example, the direction control unit 1190 may calculate the movement direction of the moving object from information detected by various sensors such as a geomagnetic sensor and an acceleration sensor. The direction control unit 1190 may calculate the movement direction of the moving object from the circumferential captured images captured by the imaging device.

Here, in the embodiment, the direction control unit 1190 preferably calculates the movement direction of the moving object from the circumferential captured images that were captured. In the configuration, the direction control unit 1190 can calculate the movement direction of the moving object more efficiently when the rotation in the image processing by the image correction unit 1130 is calculated.

Specifically, when the moving object (more specifically, the imaging device) rotates while translating, a translation component is considered to be superimposed on the change amount F(t+1) of the local feature amount U(t) of the spherical image A and the local feature amount U(t+1) of the spherical image B described in the image correction unit 1130 in addition to the rotation component. Accordingly, as described above, after the rotation Q(t+1) is estimated by the image correction unit 1130, the direction control unit 1190 calculates a difference between the 3-dimensional feature amount P(t+1) of the spherical image B and the 3-dimensional feature amount P(t)*Q(t+1) obtained through the estimated rotation Q(t+1) of the spherical image A. Accordingly, a translation component T(t+1) between the spherical image B and the spherical image A can be estimated as a difference between P(t+1) and P(t)*Q(t+1) (expression 203).

[Math. 3]

$$T(t+1)=P(t+1)-P(t)*Q(t+1) \quad \text{(expression 203)}$$

The translation of the circumferential captured image can be considered to be generated by movement of the moving object which is being imaged. Accordingly, the movement direction of the moving object can be estimated as an opposite direction to the translation direction of the circumferential captured image, and thus the direction control unit 1190 can estimate the opposite direction of the estimated movement direction of the translation component T(t+1) as the movement direction of the moving object.

Further, the direction control unit 1190 preferably performs a time averaging process on the calculated T(t+1) and estimates the movement direction of the moving object from the translation component T subjected to the time averaging. This is because when the movement direction of the moving object is frequently changed, there is a possibility of the user feeling "nausea" when the direction control unit 1190 frequently rotates the display field angle of the display image viewed by the user. It is needless to say that the direction control unit 1190 preferably uses the movement direction of the moving object averaged at a predetermined time as the movement direction of the moving object even when the movement direction of the moving object is calculated with another method.

In accordance with the foregoing method, the direction control unit 1190 calculating the movement direction of the moving object changes the display field angle of the display image displayed in the display region viewed by the user so that the movement direction of the moving object matches the reference direction of the display image viewed by the user. In particular, when an angle difference between the movement direction of the moving object and the front direction of the moving object is within a threshold value (for example, 15° to either side for a total of 30°), the direction control unit 1190 preferably controls the display image so that the captured image in the front direction of the moving object is displayed in front of the user when the user faces in the front direction. Accordingly, since the direction control unit 1190 can match the front direction of the moving object with the field angle direction of the display image displayed in front when the user faces in the front direction, it is possible to resolve the unnaturalness of the display image occurring when the moving object changes its movement direction.

Hereinafter, a method of rotating the field angle of the image displayed in the display region viewed by the user to match the movement direction of the moving object in order for the direction control unit 1190 to match the movement direction of the moving object with the reference direction of the display image viewed by the user will be described more specifically with reference to FIG. 20.

Figure 20:
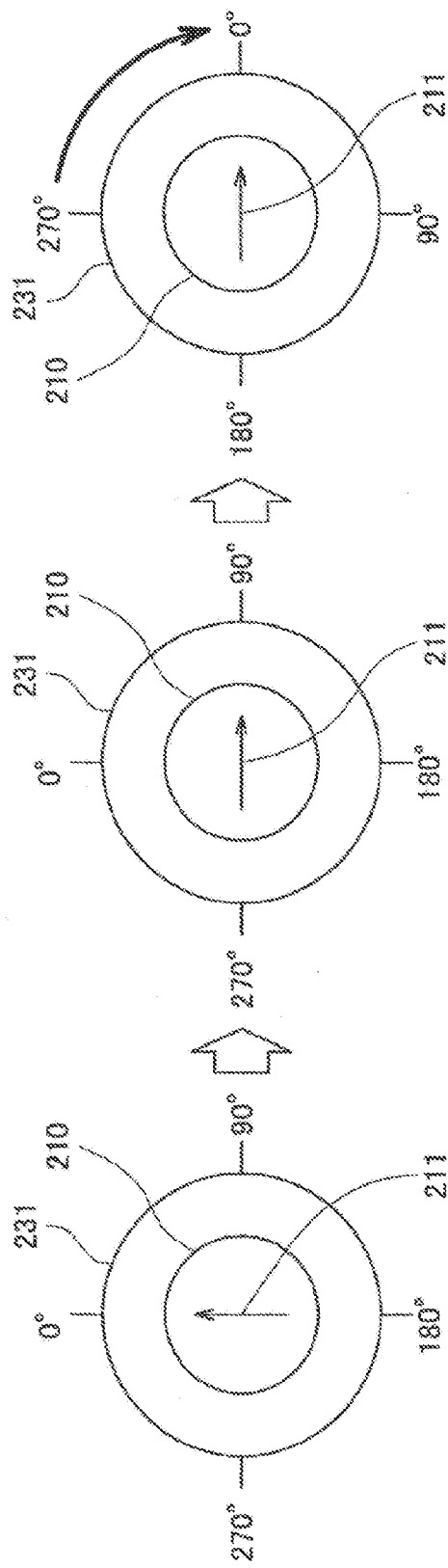
FIG. 20 is an explanatory diagram for describing a function of the information processing device according to the embodiment.

For example, as illustrated in FIG. 20, a movement direction 211 of a moving object 210 is indicated by an arrow and a field angle direction of a display image 231 viewed by the user is assumed to be indicated by angle display. Further, "0°" in the display image 231 viewed by the user is assumed to be the field angle direction of the display image (that is, the reference direction of the display image) displayed in front of the user when the user faces in the front direction.

Here, as illustrated in FIG. 20, when the moving object 210 changes the movement direction 211 to the right, the direction control unit 1190 rotates the display field angle of the circumferential captured image to change the display image 231 viewed in front by the user so that the movement direction 211 of the moving object and "0°" of the display image 231 viewed by the user match. Accordingly, it is possible to match the movement direction of the moving object with the field angle direction of the display image displayed in front of the user when the user faces in the front direction. Therefore, even when the moving object changes its movement direction, the direction control unit 1190 can prevent a first-person viewpoint image viewed by the user from always being oriented in one direction and thus an unnatural image from being generated.

A speed at which the direction control unit 1190 rotates the display field angle of the circumferential captured image to match the reference direction of the display image viewed by the user with the movement direction of the moving object is preferably a predetermined speed. The speed at which the direction control unit 1190 rotates the display field angle of the circumferential captured image will be described with reference to FIG. 21.

Figure 21:
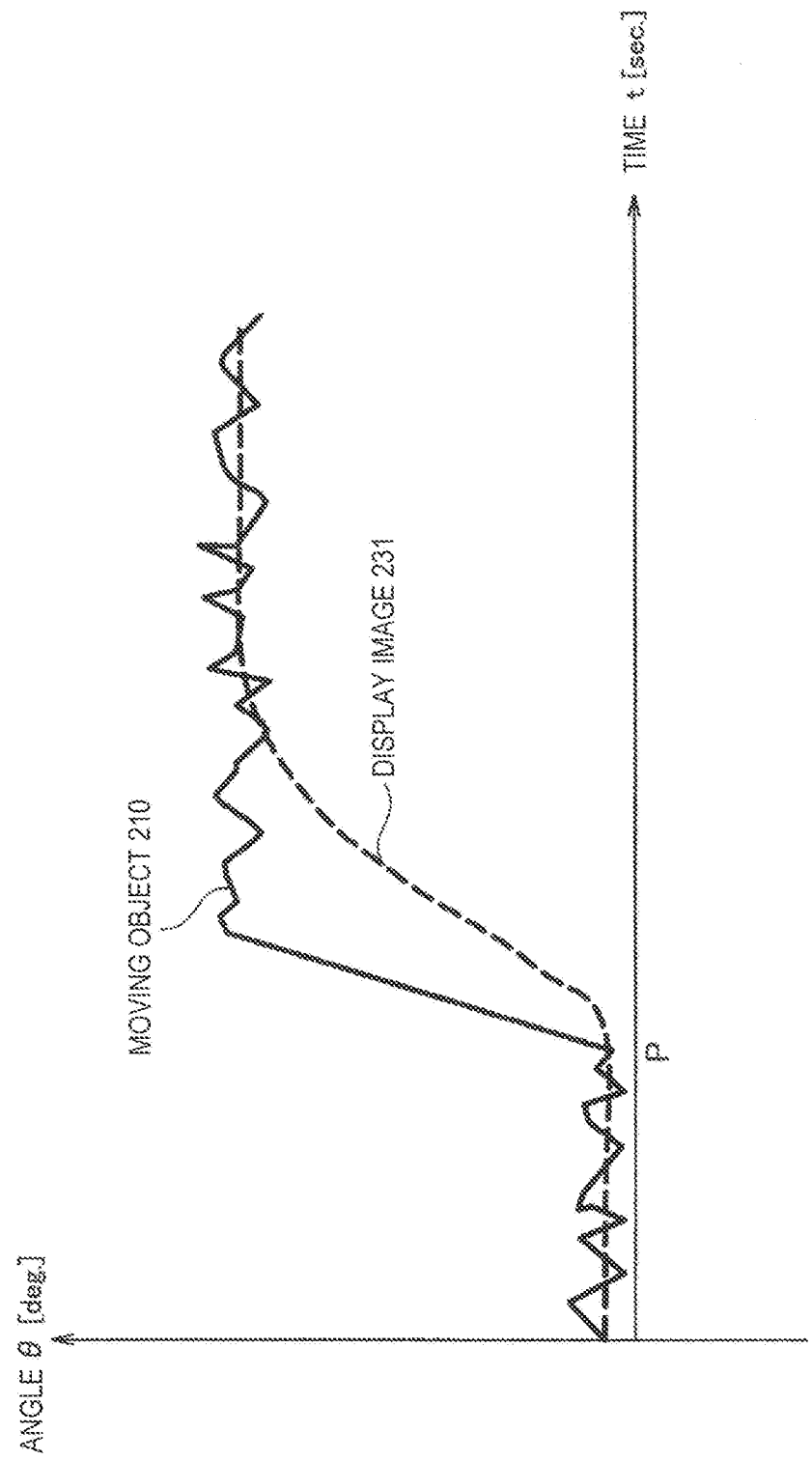
FIG. 21 is an explanatory diagram for describing a function of the information processing device according to the embodiment.

FIG. 21 is a graph illustrating temporal changes of the movement direction of the moving object 210 and the reference direction of the display image 231 viewed by the user. The changes of both of the directions are indicated as angle changes. As illustrated in FIG. 21, for example, when the movement direction of the moving object 210 is changed at time P by an operation of turning to the right, the direction control unit 1190 rotates the field angle of the display image 231 at the predetermined speed so that the reference direction of the display image 231 viewed by the user matches the movement direction of the moving object 210. Here, in order for the user not to feel "nausea" or the unnaturalness due to abrupt rotation of the field angle of the display image 231, the direction control unit 1190 preferably gently rotates the field angle of the display image 231 at the predetermined speed.

The predetermined speed at which the field angle of the display image 231 is rotated may be controlled through selection of the user or may be controlled at a movement speed or a rotation speed of the moving object 210. For example, when the movement speed or the rotation speed of the moving object 210 is fast, the direction control unit 1190 may rotate the field angle of the display image 231 faster. A correspondence relation between the movement speed or the rotation speed of the moving object 210 and the rotation speed of the field angle direction of the display image 231 is preferably stored in advance in the storage unit 1180 in the form of a correspondence table, a function, or the like.

The above-described function of controlling the field angle of the image displayed in the display region viewed by the user may be controlled so that the function is not performed by an input from the user or a user state.

For example, when the user intentionally desires to view in a different direction from the movement direction of the moving object, the function of the direction control unit 1190 may be controlled so that the function is not performed according to an input from the user. The input from the user is, for example, an input operation in which the user maintains the user manipulation device which is a wearable terminal to fix the user manipulation device with both hands.

When the user views in various directions and the visual line direction is not constantly decided, the function of the direction control unit 1190 may be controlled so that the function is not performed. Specifically, when a detected variation amount of the visual line direction of the user exceeds a threshold value, the function of the direction control unit 1190 may be controlled so that the function is not performed. When the variation amount of the visual line direction of the user is equal to or less than the threshold value for a given time, the function of the direction control unit 1190 may be controlled so that the function is performed.

In the embodiment, in the display image supplied to the user, the visual line direction of the moving object (for example, a human being) may be displayed or a trajectory of the visual line direction of the moving object (for example, a human being) may be displayed. When the display image (for example, the image viewed by the user) is supplied from the information processing device 1100 to the moving object (for example, a human being), the visual line direction of the user may be displayed in the display image or the trajectory of the visual line direction of the user may be displayed in the display image.

The example of the function of the information processing device 1100 according to the embodiment has been described. The foregoing constituent elements may be configured using general members or circuits or may be configured by hardware specialized for the functions of the constituent elements. All of the functions of the constituent elements may be performed by a CPU or the like. The hardware configurations of the embodiment can be changed appropriately according to technology levels whenever the embodiment is realized.

A computer program for realizing each function of the information processing device according to the above-described embodiment can be created to be mounted on a personal computer or the like. A computer-readable recording medium in which such a computer program is stored can also be supplied. Examples of the recording medium include a magnetic disk, an optical disc, a magneto-optical disc, and a flash memory. The computer program may be delivered via, for example, a network without using a recording medium.

The image generation unit 1110, the image selection unit 1120, the image correction unit 1130, the direction control unit 1190, the data acquisition unit 1160, the data supply unit 1170, and the storage unit 1180 illustrated in FIG. 18 may be mounted on another device such as a computer capable of communicating with the information processing device

10100 and the information processing device 1100 may cooperate with the other device to realize the foregoing functions.

<Flow of Information Processing Method>

Next, the flow of the information processing method performed by the information processing device 1100 according to the embodiment will be described in brief with reference to FIG. 22.

In the information processing method according to the embodiment, the captured image data is first acquired from the imaging device (camera) mounted on the moving object (step S171).

Next, the image generation unit 1110 of the information processing device 1100 generates the circumferential captured images such as the spherical images or the rectangular images obtained by converting the spherical images into the rectangular form based on the acquired captured image data (step S173).

The image correction unit 1130 of the information processing device 1100 performs the image processing on the circumferential captured image to extract the rotation component from the generated circumferential captured image and correct the rotation of the moving object (more specifically, the imaging device) (step S175).

Subsequently, the direction control unit 1190 of the information processing device 1100 acquires movement direction data of the moving object (step S177).

Here, the direction control unit 1190 of the information processing device 1100 determines whether the angle difference between the movement direction of the moving object and the reference direction of the moving object (for example, the front direction of the moving object) is within the threshold value (step S179). Here, the threshold value may be, for example, 30° (that is 15° to either side).

When the angle difference between the movement direction of the moving object and the reference direction of the moving object exceeds the threshold value (No in step S179), the image selection unit 1120 of the information processing device 1100 selects the image to be viewed by the user among the circumferential captured images. The display control unit 1150 of the information processing device 1100 controls the display of the selected image on the display screen of the user manipulation device (step S181).

Conversely, when the angle difference between the movement direction of the moving object and the reference direction of the moving object is within the threshold value (Yes in step S179), the image selection unit 1120 and the display control unit 1150 of the information processing device 1100 control the display of the image on the display screen as in step S181 (step S183). Further, the direction control unit 1190 of the information processing device 1100 performs display control such that the circumferential captured image displayed on the display screen is rotated at the predetermined speed at which the movement direction or the reference direction of the moving object matches the reference direction of the user (step S185).

Accordingly, the information processing device 1100 can correct the shake of the circumferential captured image caused due to the rotation of the imaging device and can supply the user with the circumferential captured image which is not unnatural even when the moving object changes its movement direction.

Figure 22:
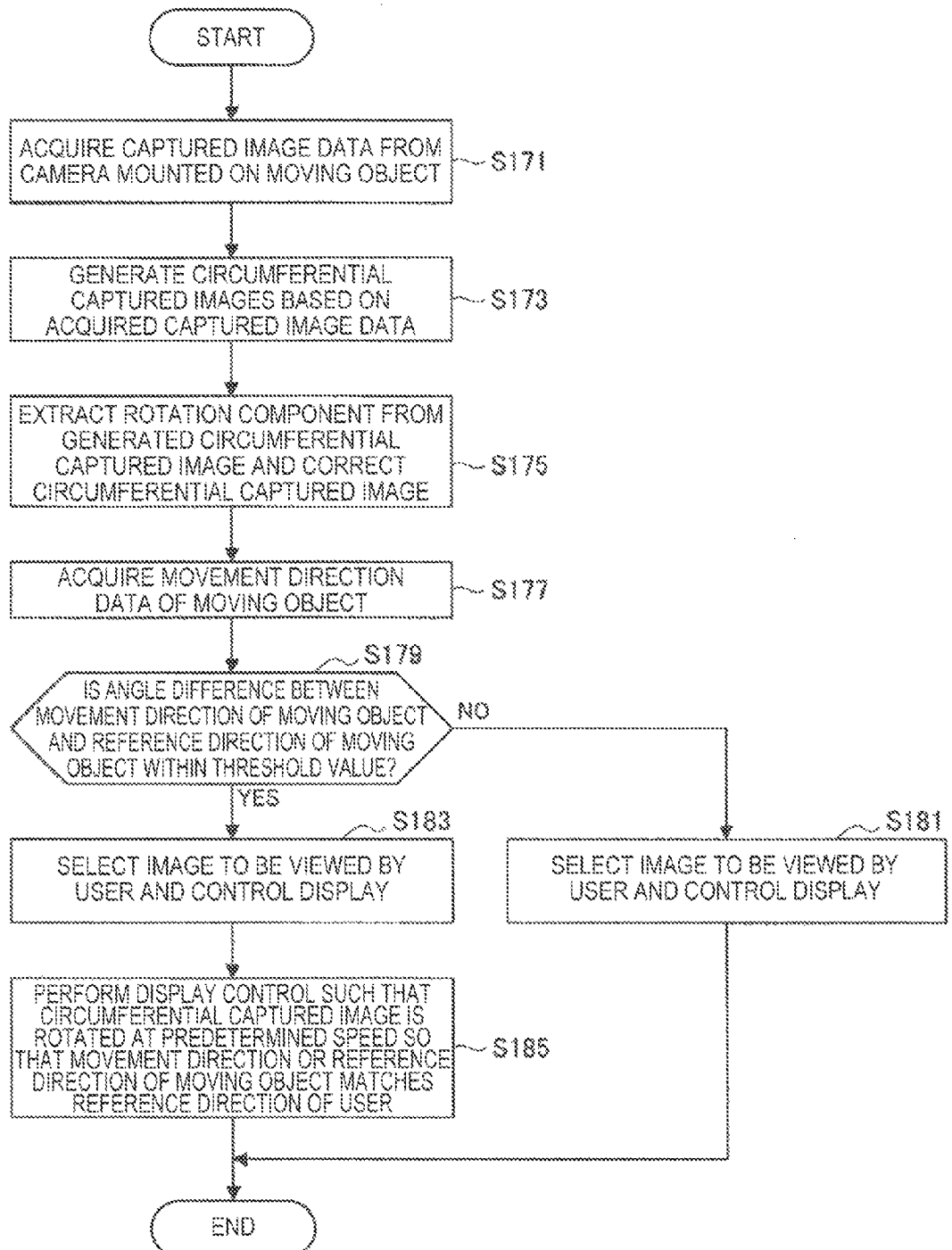
FIG. 22 is a flowchart illustrating a flow example of an information processing method according to the embodiment.

The flow of the information processing method according to the embodiment has been described in brief with reference to FIG. 22.

<Modification Example of Information Processing Method>

Next, modification examples of the embodiment will be described with reference to FIG. 23. The modification examples of the embodiment are an information processing device and an information processing method of controlling an image correction unit so that rotation correction is not performed on a circumferential captured image when a motion (movement) of a moving object is synchronized with a motion (movement) of a user.

That is, in the modification examples of the embodiment, the image correction unit 1130 determines whether the motion of the moving object is synchronized with the motion of the user. When the motion of the moving object is determined to be synchronized with the motion of the user, the functions of the image correction unit 1130 and the direction control unit 1190 are controlled so that the functions are not performed.

Specifically, the present inventors have found that "nausea" can be reduced and the sense of presence can be improved when the movement or awareness of a user observing a circumferential captured image is synchronized with a movement experienced by a moving object (for example, a human being). Accordingly, in the modification examples of the embodiment, by not performing rotation correction on the circumferential captured image when the movement of the moving object (for example, a human being) is synchronized with the movement of the user, it is possible to supply the image with a greater sense of presence to the user. In the modification examples of the invention, when a movement not synchronized between the moving object and the user is detected, "nausea" is prevented from occurring for the user by performing the rotation correction on the circumferential captured image.

A movement for which a motion of the moving object (for example, a human being) is synchronized with a motion of the user is, for example, a movement following a tennis ball.

Here, the "synchronization" of a motion of the moving object and a motion of the user will be described with reference to FIG. 23. FIG. 23 is a graph illustrating an angle change of rotation of the head of the moving object and an angle change of rotation of the head of the user over time.

Figure 23:
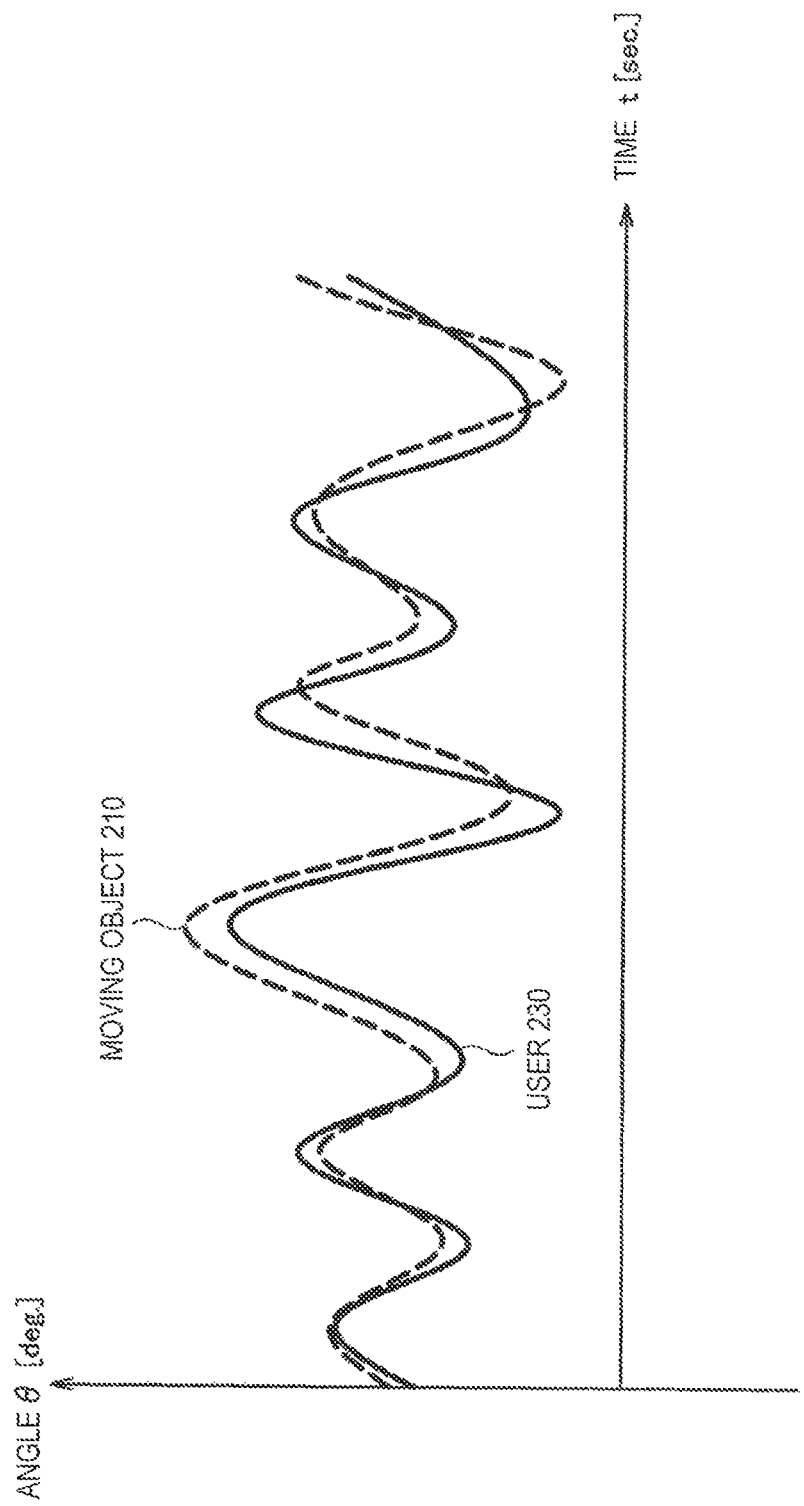
FIG. 23 is an explanatory diagram for describing a function of the information processing device according to a modification example of the embodiment.

As illustrated in FIG. 23, the "synchronization" of a motion of the moving object and a motion of the user indicates, for example, that the directions of the rotation of the heads of the moving object and the user are the same. Specifically, in FIG. 23, a waveform of the rotation of the head of a moving object 210 and a waveform of the rotation of the head of a user 230 vary in amplitudes and periods, but timings of upper crests and timings of lower troughs are substantially the same. In this case, the movement of the moving object and the movement of the user can be said to be "synchronized."

More preferably, the "synchronization" of the motion of the moving object and the motion of the user indicates a case in which the directions of the rotation of the heads of the moving object and the user are the same and rotation amounts of the rotation of the heads of the moving object and the user are equal to or greater than a predetermined amount. When the rotation amounts of the rotation of the heads of the moving object and the user are small, there is a possibility of the directions of the rotation of the heads of the moving object and the user matching unintentionally due to an involuntary movement or the like. Accordingly, when the rotation amounts of the rotation of the heads of the moving object and the user are equal to or greater than the predetermined amount and the directions of the rotation of the heads of the moving object and the user are the same, the user can more reliably be said to be consciously "synchronizing" the movement of the moving object with his or her movement. The predetermined amount is, for example, 40 (that is 20° on one side).

In addition to the detection of the rotation of the head of the moving object and the rotation of the head of the user, it is also possible to detect "synchronization" of a motion of the moving object and a motion of the user.

For example, when a movement direction of a centroid position of a moving object (for example, a human being) matches a movement direction of a centroid position of a user, the motion of the moving object may be considered to be "synchronized" with the motion of the user. When an inclination direction of the body of a moving object (for example, a human being) matches an inclination direction of the body of a user, the motion of the moving object may be considered to be "synchronized" with the motion of the user. It is possible to detect the centroid positions and the inclinations of the bodies of the moving object and the user, for example, using known sensors such as an acceleration sensor and a motion sensor.

For example, when a visual line direction of a moving object matches a visual line direction of a user, a motion of the moving object (for example, a human being) may be considered to be "synchronized" with a motion of the user. Further, when a gazing point of a moving object matches a gazing point of a user, a motion of the moving object may be considered to be "synchronized" with a motion of the user. This is because awareness or recognition is considered to be substantially matched (synchronized) between the moving object (for example, a human being) and the user. It is possible to detect the visual line direction or the gazing point, for example, by a visual line detection function of a wearable terminal mounted on the moving object (for example, a human being) and the user. The visual line detection function can be realized according to the method described in the first embodiment or a known method.

By combining the above-described methods of detecting the "synchronization" of the motion of the moving object and the motion of the user, it is possible to detect the "synchronization" of the motion of the moving object and the motion of the user more reliably.

In the modification examples of the embodiment, when the movement of the moving object (for example, a human being) is synchronized with the movement of the user, the image correction unit 1130 does not perform the rotation correction on the circumferential captured image. When movements not synchronized between the moving object and the user are detected, the image correction unit 1130 performs the rotation correction on the circumferential captured image. The flow of the information processing method performed in the modification examples of the embodiment will be described with reference to FIG. 24.

Here, in the following description, movements experienced by a moving object and a user are assumed to be movements between the moving object and the user or movements in which conscious synchronization is possible.

In the information processing method according to a modification example of the embodiment, the captured image data is first acquired from the imaging device (camera) mounted on the moving object (step S191).

Next, the image generation unit 1110 of the information processing device 1100 generates the circumferential captured image, for example, the spherical image or the rectangular image obtained by converting the spherical image into a rectangular form based on the acquired captured image data (step S193).

Here, the image correction unit 1130 of the information processing device 1100 determines whether the rotation of the moving object (more specifically, the imaging device) is synchronized with the rotation of a terminal mounted on the user. More specifically, the image correction unit 1130 of the information processing device 1100 determines whether the direction of the rotation of the imaging device is the same as the direction of the rotation of the terminal mounted on the user (step S195).

Here, when the rotation of the imaging device is not synchronized with the rotation of the terminal mounted on the user (No in step S195), the image correction unit 1130 of the information processing device 1100 performs the image processing on the circumferential captured image to extract the rotation component from the circumferential captured image and correct the rotation of the imaging device (step S197). Here, the direction control unit 1190 may further control the display image based on the movement direction of the moving object.

Conversely, when the rotation of the moving object is synchronized with the rotation of the terminal mounted on the user (Yes in step S195), the image correction unit 1130 of the information processing device 1100 does not perform the image processing on the circumferential captured image to correct the rotation of the imaging device.

Thereafter, the image selection unit 1120 of the information processing device 1100 selects the image to be viewed by the user among the circumferential captured images. The display control unit 1150 of the information processing device 1100 controls the display of the selected image on the display screen of the user manipulation device (step S199).

Accordingly, the information processing device 1100 can supply the circumferential captured image with a higher sense of presence to the user when the user observes the circumferential captured image while experiencing the motion synchronized with the moving object.

Figure 24:
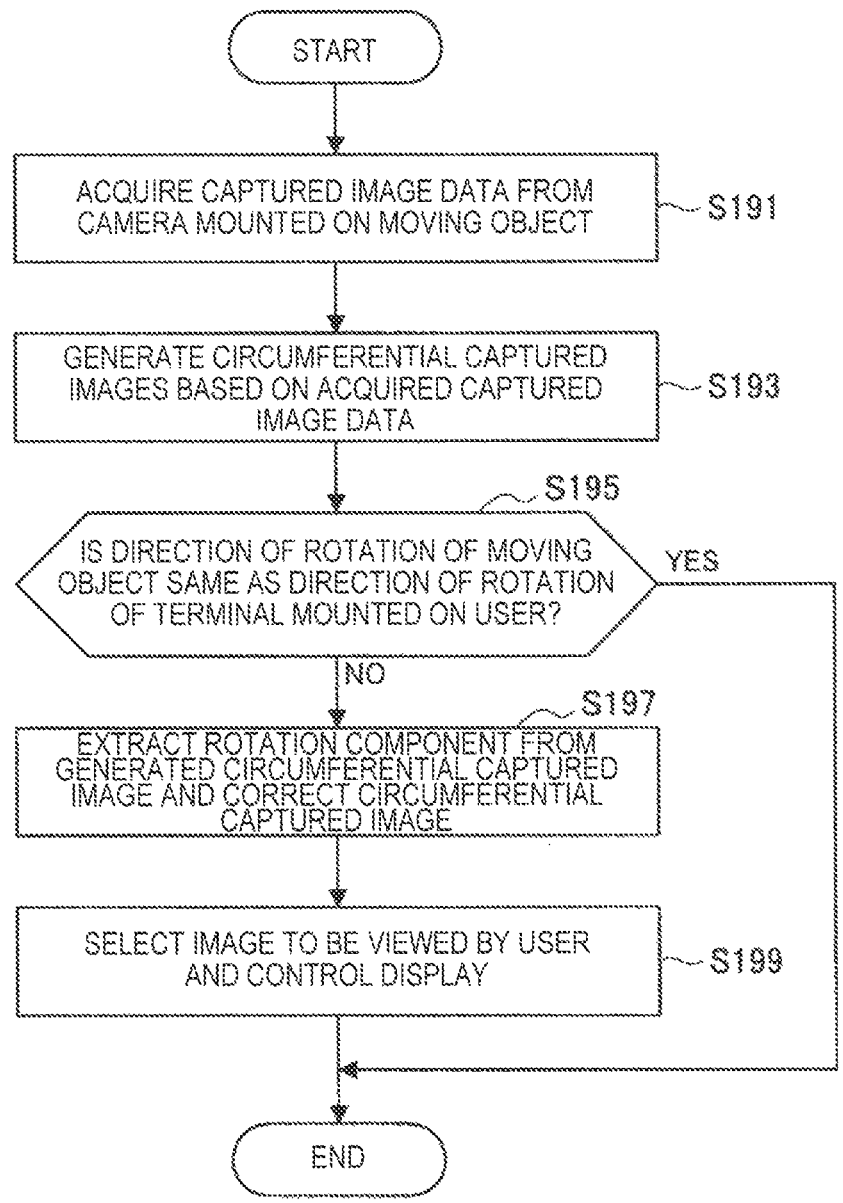
FIG. 24 is a flowchart illustrating a flow example of an information processing method according to the modification example of the embodiment.

The flow of the information processing method according to the modification example of the embodiment has been described in brief above with reference to FIG. 24.

<Conclusion>

In this way, in the information processing device and the information processing method according to the embodiment, a video surrounding the moving object can be observed as the circumferential captured images in real time, and thus the user can obtain the sense of presence just as if the user were in the same location as the moving object. By performing the foregoing correction process, the shake of the images caused due to the rotation movement of the moving object is suppressed and the change in the movement direction of the moving object can be reflected in the display image. Therefore, occurrence of motion sickness (nausea) is suppressed and the user can view the more natural first-person captured image.

Further, in the information processing device and the information processing method according to the modification examples of the embodiment, the circumferential captured image with the higher sense of presence can be supplied to the user when the user observes the circumferential captured image while experiencing the motion synchronized with the moving object.

The information processing device and the information processing method according to the second embodiment of the present disclosure have been described in detail above.

Third Embodiment

In the related art, many technologies for acquiring real scenery with a plurality of cameras, recombining the scenery in a virtual space, and allowing a user to view the space have been developed. Examples of the technologies include a technology for enabling an image captured by a camera mounted on a traveling automobile to be moved inside an image in association with positional information and a technology for mounting a camera capable of capturing an omnidirectional image and enabling a visual line direction to be changed freely from a certain location. By these technologies, a circumferential image can be viewed while moving in a virtual space. On the other hand, although an observation point is moved to a nearby observation point and an omnidirectional image can be observed in these technologies since photographing spots are discrete, a viewpoint may not be moved smoothly. Accordingly, images realized by these technologies are different from images reproduced as if a user were at the location.

There is a method called a ray-space theory (Light Field) for enabling a viewpoint position to be moved by imaging a space with cameras disposed in a lattice form. In the ray-space theory, after a space is photographed by a camera array disposed in the lattice form, pixels included in a captured image are spatially projected to a space having two projection planes, as illustrated in FIG. 25.

Accordingly, light (for example, ray 1 in FIG. 25) passing through a rectangular space formed by projection planes A and B can be expressed as one point in a 4-dimensional space that is realized with L(u, v, s, t) using coordinates (u, v) indicating a position on the projection A and coordinates (s, v) indicating a position on the projection plane B. By expressing the light passing through the two projection planes in the foregoing 4-dimensional space, it is possible to recombine an image from a certain viewpoint from the 4-dimensional space illustrated in FIG. 25.

Figure 25:
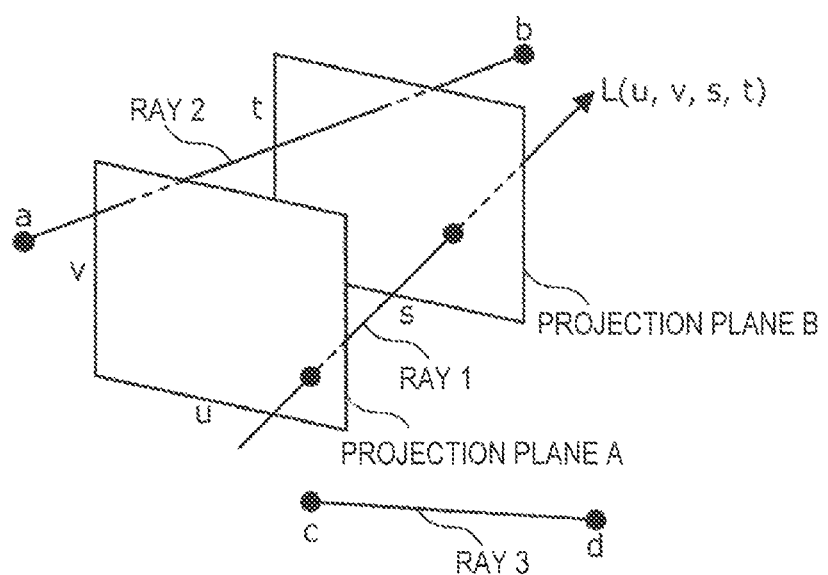
FIG. 25 is an explanatory diagram for describing a ray space.

For example, in FIG. 25, a point a indicates a viewpoint and a point b indicates an observation point viewed from the viewpoint a. The light (ray 2) flowing from the viewpoint a to the observation point b can be expressed by the foregoing L. Accordingly, on any projection plane located between the projection planes A and B, a visual field from the viewpoint a can be reproduced by repeating the same process at the points which form the projection plane.

However, in the configuration of the ray space illustrated in FIG. 25, there is still a restriction on the degree of freedom of the position of a viewpoint. For example, since a visual line (ray 3) from a viewpoint c in FIG. 25 does not penetrate through the projection planes A and B, the visual line may not be expressed as a point in the ray space L. Accordingly, in the recombination of the visual field based on the ray space illustrated in FIG. 25, there is a restriction on a position.

Accordingly, the present inventors, through diligent investigation, have come up with a technology capable of recombining a visual field without a restriction and thus finalized an information processing device to be described below.

<Example of Configuration of System>

Figure 26:
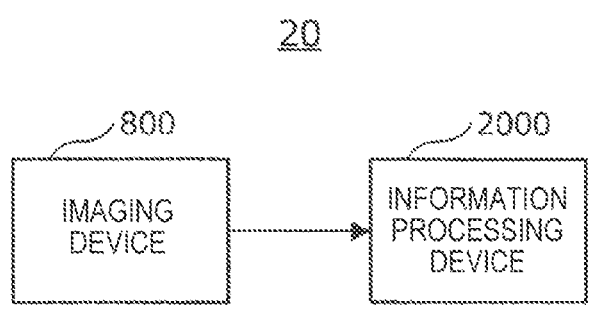
FIG. 26 is an explanatory diagram illustrating a schematic configuration of a system according to a third embodiment of the present disclosure.

FIG. 26 is a diagram illustrating a schematic configuration of a system according to a third embodiment of the present disclosure. As illustrated in FIG. 26, a system 20 according to the embodiment includes an imaging device 800 and an information processing device 2000.

The restriction in the ray-space theory illustrated in FIG. 25 is caused because the arrayed cameras which are imaging devices are disposed in the 2-dimensional lattice form. Accordingly, the present inventors thought to remove the restriction on viewpoints by disposing cameras in a 3-dimensional lattice form. In this case, however, problems that (1) certain cameras conceal the visual fields of the other cameras and (2) the number of necessary cameras is too large may occur.

Accordingly, the present inventors investigated self-propelled type imaging devices used for imaging and consequently came up with the idea that a space can be imaged in a 3-dimensional lattice form using an imaging device 800 which can freely move in a space while avoiding the foregoing problems. The imaging device 800 will be described in detail again below.

In the system 20 according to the embodiment, a plurality of pieces of captured data captured by the self-propelled imaging device 800 are supplied to the information processing device 2000 and an image reconstruction process is performed based on the plurality of pieces of captured data in the information processing device 2000.

The information processing device 2000 performs the image reconstruction process based on the plurality of pieces of captured data captured by the imaging device 800. When the information processing device 2000 performs the image reconstruction process, the information processing device 2000 generates a 3-dimensional imaged space using the plurality of pieces of captured data captured by the imaging device 800. The information processing device 2000 performs the image reconstruction process using the generated imaged space or a ray space further generated based on the generated imaged space. For example, the information processing device 2000 may be configured by at least one of the server 100 and the client devices 200 to 700 included in the system 10 according to the first embodiment described with reference to FIG. 1. In this case, the server 100 and the client devices 200 to 700 are independently or cooperatively realized as the information processing device 2000 to be described in detail below in terms of the entire system 20. It is needless to say that the information processing device 2000 may be configured by any of various independent computers. Since the hardware device configuration of the information processing device 2000 is the same as that in FIG. 2, the detailed description thereof will be omitted below. The configuration of the information processing device 2000 will be described in detail again below.

<Configuration of Imaging Device>

The imaging device 800 according to the embodiment may be configured as a single imaging device such as a robot which can freely move in a space. However, the self-propelled type imaging device 800 with arrayed cameras illustrated in FIG. 27A or 27B is preferably used.

Figure 27A:
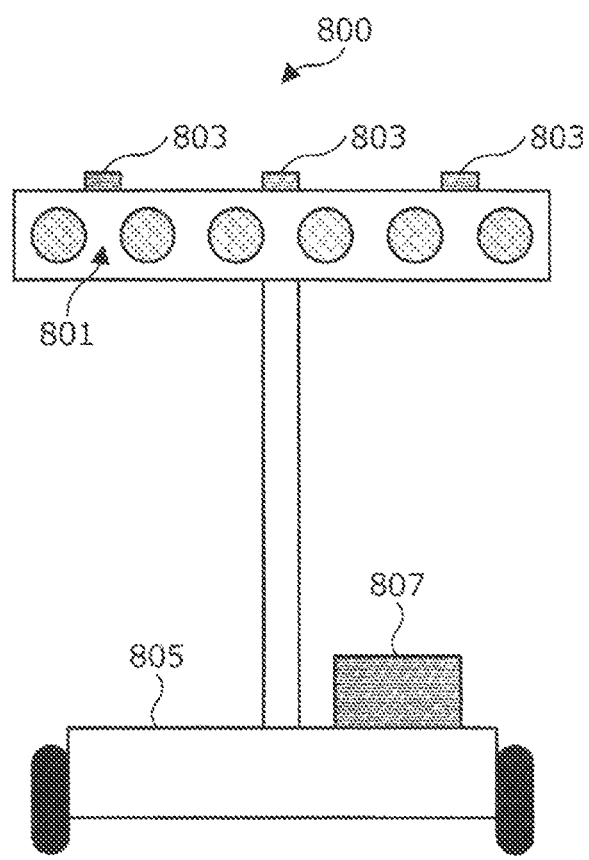
FIG. 27A is an explanatory diagram illustrating a schematic configuration of an imaging device according to the embodiment.

In the imaging device 800 illustrated in FIG. 27A, cameras 801 are arranged to be disposed in a 1-dimensional direction. At least one position recognition marker 803 for specifying an imaging position is installed above the cameras 801. The cameras 801 and the position recognition markers 803 are supported by a portable stand 805 having vehicle wheels. The cameras 801 or the stand 805 are controlled by a control computer 807 which is installed on the stand 805 and includes a battery. In the imaging device 800 illustrated in FIG. 27B, the cameras 801 illustrated in FIG. 27A are disposed in an array form in 2-dimensional directions.

Figure 27B:
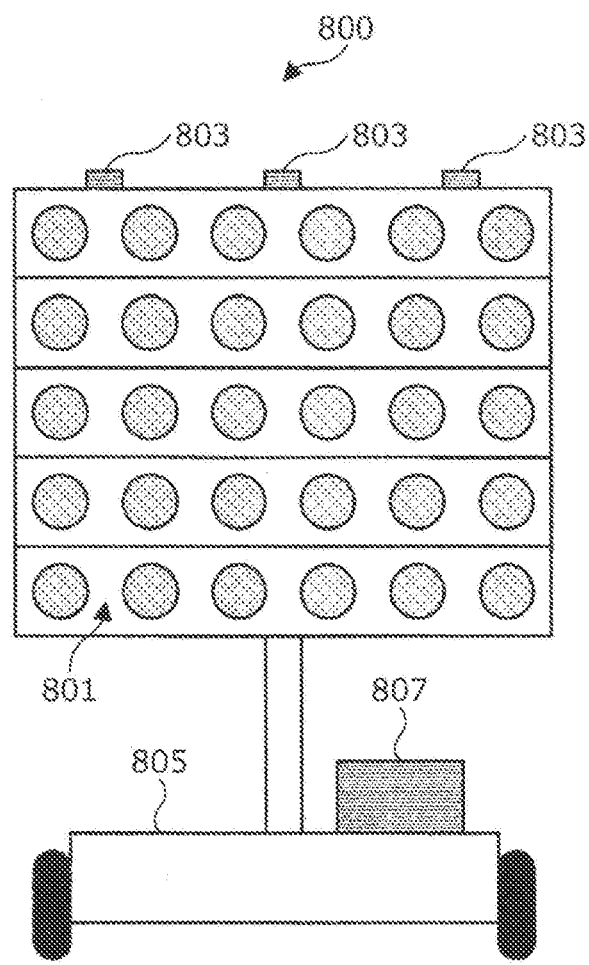
FIG. 27B is an explanatory diagram illustrating a schematic configuration of an imaging device according to the embodiment.

In the system 20 according to the embodiment, the imaging device 800 illustrated in FIG. 27A or 27B repeats an imaging process while moving in a space.

Figure 28A:
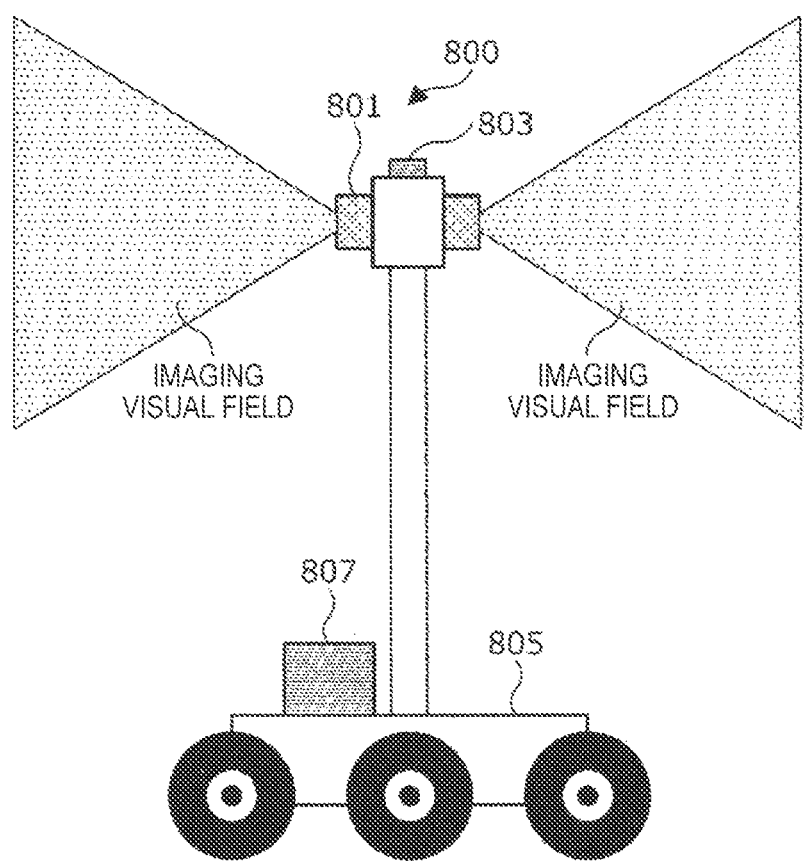
FIG. 28A is an explanatory diagram illustrating a schematic configuration of an imaging device according to the embodiment.
Figure 28B:
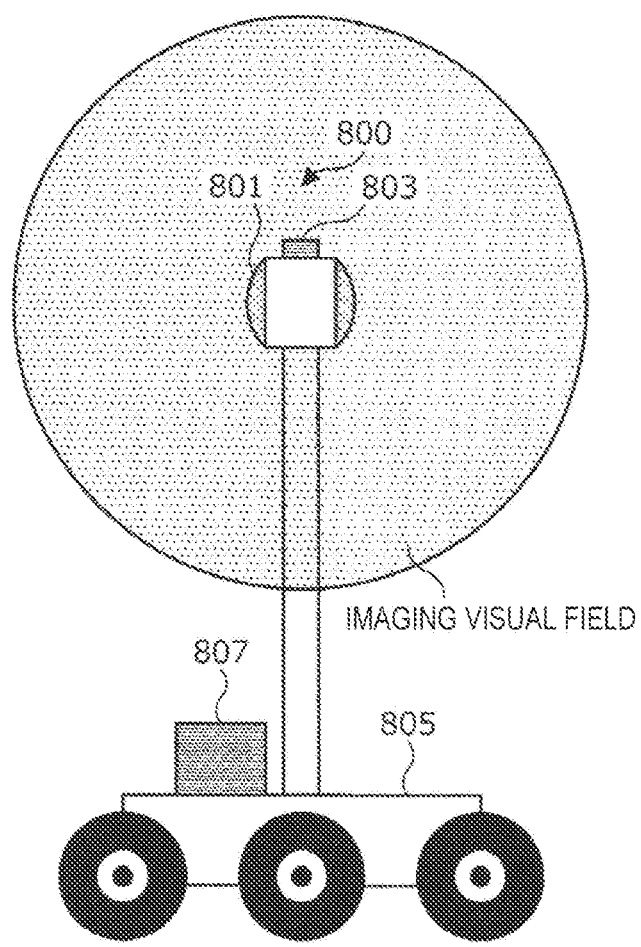
FIG. 28B is an explanatory diagram illustrating a schematic configuration of an imaging device according to the embodiment.

The cameras 801 installed in the imaging devices 800 illustrated in FIGS. 27A and 27B may be wide angle cameras in which only a field angle of a predetermined direction is set as an imaging visual field, as illustrated in FIG. 28A, or may be omnidirectional cameras in which the entire circumference is an imaging visual field, as illustrated in FIG. 28B. However, as will be described below, it is preferable to perform imaging as densely as possible in as many directions as possible in the space. Therefore, an omnidirectional camera illustrated in FIG. 28B is preferable as the camera 801 installed in the imaging device 800.

The imaging device 800 according to the embodiment repeats imaging while moving in the space at a predetermined interval (preferably a constant interval), as schematically illustrated in FIG. 29. At this time, imaging positions in the space are recorded simultaneously with the imaging by the position recognition markers 803 installed in the imaging device 800.

The plurality of pieces of captured data captured by the imaging device 800 are output to the information processing device 2000.

<Configuration of Information Processing Device>

Figure 30:
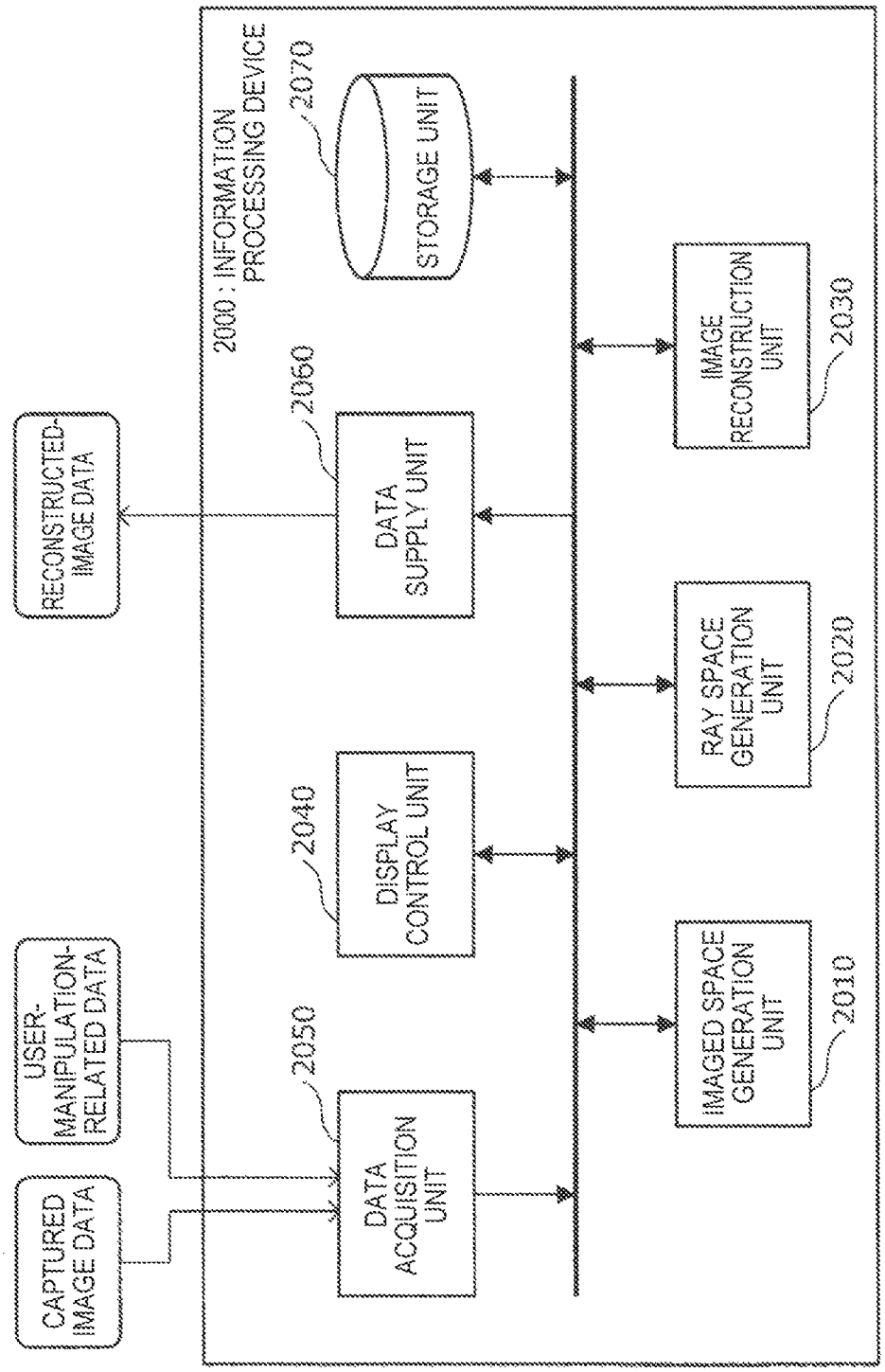
FIG. 30 is a block diagram illustrating an example of the configuration of an information processing device according to the embodiment.

The information processing device 2000 according to the embodiment includes an imaged space generation unit 201, a ray space generation unit 2020, and an image reconstruction unit 2030, as illustrated in FIG. 30. The information processing device 2000 may further include one of a display control unit 2040, a data acquisition unit 2050, a data supply unit 2060, and a storage unit 2070. Here, the processing units illustrated in FIG. 30 may be realized by any one of the server 100 and the client devices 200 to 700 or may be distributed to the plurality of devices to be realized.

The imaged space generation unit 2010 generates an imaged space in which information indicating positions at which the captured images are generated in a space are associated with the corresponding captured images, using the plurality of captured images captured by the imaging device 800 moving in the space or an imaging device mounted on a moving object moving in the space. Since the position recognition markers 803 are installed along with the cameras 801 in the imaging device 800 according to the embodiment, the captured images are easily associated with the imaging positions. For example, as schematically illustrated in FIG. 31, the generated imaged space is a 3-dimensional space in which lattice points correspond to the imaging positions of the imaging device 800 or the like and the captured images are associated with the lattice points.

By generating such an imaged space, it is possible to supply the captured image associated with an imaging position (x', y', z') closest to a viewpoint (x, y, z), for example, when there is a designation from a user desiring to view an image viewed from the viewpoint (x, y, z). In particular, when the captured image associated with each lattice point is an omnidirectional image, a designation in the visual line direction is further received from the user and the designated image in the visual line direction is cut from the corresponding omnidirectional image so that the image can be supplied to be viewed by the user.

Figure 31:
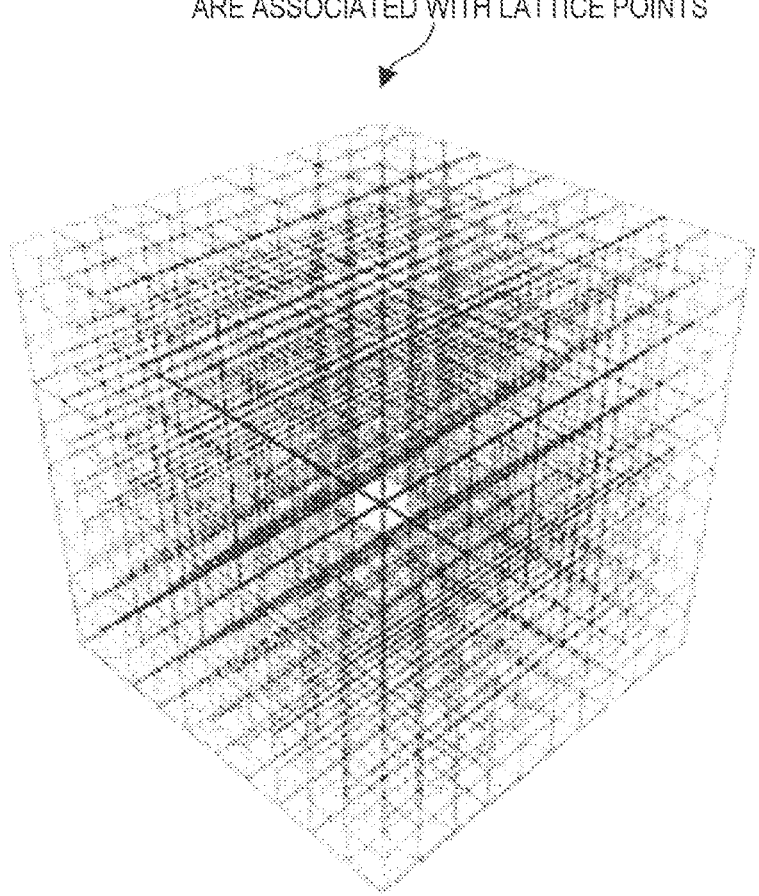
FIG. 31 is an explanatory diagram for describing a function of the information processing device according to the embodiment.

To supply the image to the user according to such a method, the number of lattice points in the imaged space illustrated in FIG. 31 is preferably as large as possible and the intervals of the mutually adjacent lattice points are preferably as short as possible.

In the information processing device 2000 according to the embodiment, not only can a free viewpoint image based on the imaged space illustrated in FIG. 31 be supplied, but a free viewpoint image based on a ray space can also be supplied. The ray space is generated by the ray space generation unit 2020 based on the imaged space generated by the imaged space generation unit 2010.

The ray space generation unit 2020 generates the ray space circumscribing the imaged space based on the imaged space generated by the imaged space generation unit 2010.

Figure 32A:
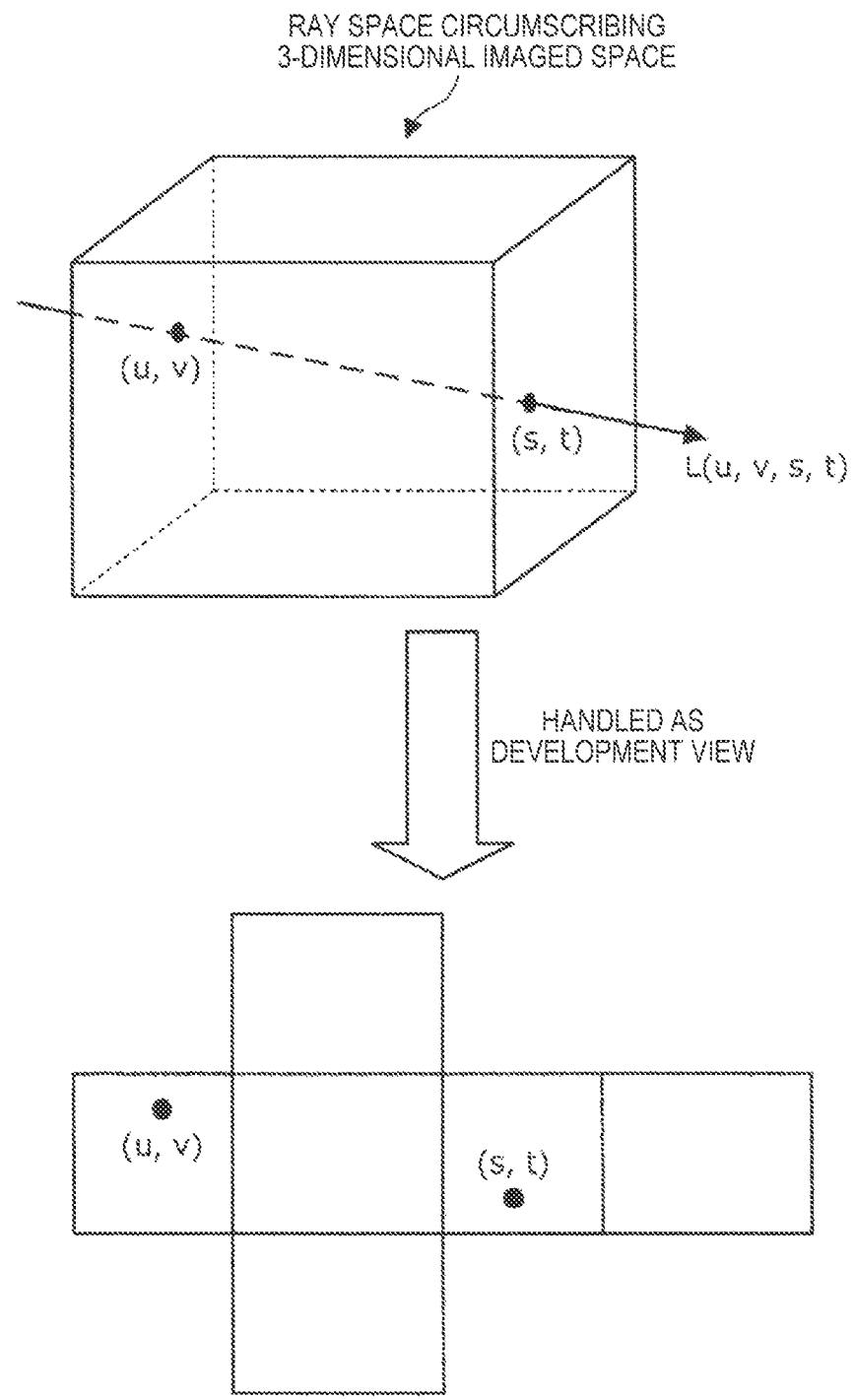
FIG. 32A is an explanatory diagram for describing a function of the information processing device according to the embodiment.

For example, the ray space may be a rectangular parallelepiped space circumscribing the imaged space, as illustrated in FIG. 32A, or may be a spherical space circumscribing the imaged space, as illustrated in FIG. 32B.

By generating the ray space circumscribing the imaged space illustrated in FIG. 32A or 32B, light penetrating through the inside of the ray space penetrates any two portions of the ray space. By generating such a ray space, all of the rays observed from the inside of the ray space can be described without limiting observation positions or observation directions.

For example, as illustrated in FIG. 32A, when the ray space is the rectangular parallelepiped space, the light penetrating the ray space penetrates two portions among six surfaces of the rectangular parallelepiped. Therefore, a ray L can be defined using the coordinates of the penetration points of the light on the rectangular parallelepiped. The ray L defined in this way corresponds to one point in the 4-dimensional space referred to as (u, v, s, t). Here, the coordinate system differs for each surface of the rectangular parallelepiped. However, as illustrated in the lower portion of FIG. 32A, points can all be expressed in the same coordinate system regardless of what surfaces are penetrated by considering the development view of the ray space.

For example, as illustrated in FIG. 32B, when the ray space is set as a spherical space, one point on the spherical surface can be converted into one point on a rectangular plane, for example, by a known method such as equidistant cylindrical projection. Accordingly, as illustrated in FIG. 32B, even when the ray space is set as the spherical space, the ray L can correspond to one point in the 4-dimensional space, as in the case of FIG. 25A.

The image shown when the space is viewed can be reconstructed in accordance with the ray space generated in this way. The reconstruction process is performed by the image reconstruction unit 2030.

The image reconstruction unit 2030 reconstructs an image corresponding to reconstruction information regarding the visual line direction and the viewpoint designated by the user based on the ray space generated by the ray space generation unit 2020 and the reconstruction information. Hereinafter, an image reconstruction method will be described with reference to FIG. 33.

Figure 33:
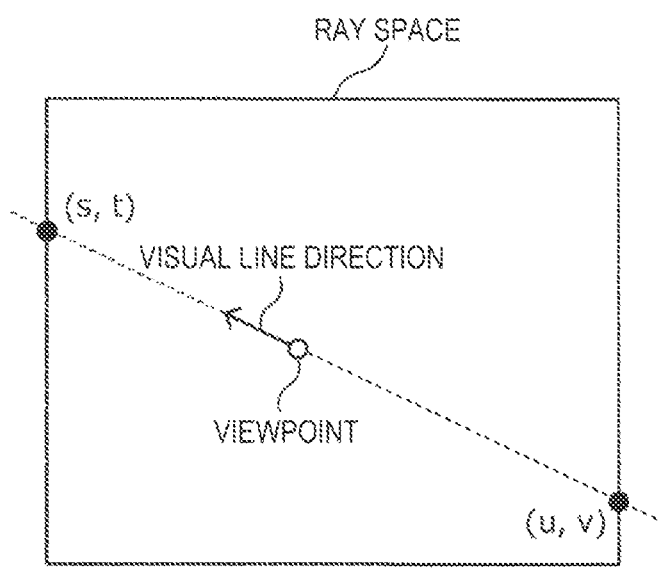
FIG. 33 is an explanatory diagram for describing a function of the information processing device according to the embodiment.

One point of the image viewed by the user can be expressed by a vector indicated by a viewpoint position and a viewpoint direction from the viewpoint position, as illustrated in FIG. 33. When a vector illustrated in FIG. 33 is specified based on the reconstruction information, the image reconstruction unit 2030 extends the vector and calculates the positions of intersection points between the vector and the ray space. Here, when the coordinates of the intersection points are (u, v) and (s, t), the ray L corresponding to pixels corresponding to the reconstruction information (pixels in a reconstructed image) can be reproduced from L(u, v, s, t), as illustrated in FIG. 33.

The image reconstruction unit 2030 can reproduce the image at any viewpoint designated by the user by repeatedly performing the above-described process on all of the pixels included in the reconstructed image.

The reconstruction method can be realized with higher precision by causing the imaging device 800 to densely capture a multi-viewpoint image and generating the ray space. Since a relation between the generated ray space and the imaging is simple and the above-described space reproduction method is simple, the foregoing process can be performed at low calculation cost. The reconstruction method according to the embodiment can be said to be a general method capable of considerably simply reconstructing an image at any viewpoint and in any direction since recognition of correspondence points between two images such as multi-viewpoint stereo images in the related art is not necessary.

The display control unit 2040 controls display content of a display device such as a display installed in the information processing device 2000 or outside of the information processing device 2000. Specifically, the display control unit 2040 can allow the user to view the imaged space generated by the imaged space generation unit 2010, the ray space generated by the ray space generation unit 2020, the image reconstructed by the image reconstruction unit 2030, or the like. Accordingly, the user can comprehend the image at any viewpoint or in any direction at all times.

The data acquisition unit 2050 acquires captured-image data output from the imaging device 800 or data regarding the imaging position or acquires data regarding a user manipulation output from the user manipulation device, various input mechanisms, or the like. The various kinds of data acquired by the data acquisition unit 2050 can be appropriately used by the processing units included in the information processing device 2000.

The data supply unit 2060 supplies the various kinds of data (for example, reconstructed-image data) generated by the information processing device 2000 to a device installed outside of the information processing device 2000. Accordingly, even the device installed outside of the information processing device 2000 can use various kinds of information generated by the information processing device 2000.

The storage unit 2070 may appropriately record various databases used for processes of the imaged space generation unit 2010, the ray space generation unit 2020, the image reconstruction unit 2030, the display control unit 2040, the data acquisition unit 2050, and the data supply unit 2060, various programs including applications used for various calculation processes performed by these processing units, and various parameters necessarily stored when certain processes are performed or courses of interim processes.

The storage unit 2070 can be freely accessed by each processing unit such as the imaged space generation unit 2010, the ray space generation unit 2020, the image reconstruction unit 2030, the display control unit 2040, the data acquisition unit 2050, and the data supply unit 2060, so that data can be written or read.

The example of the function of the information processing device 2000 according to the embodiment has been described. The foregoing constituent elements may be configured using general members or circuits or may be configured by hardware specialized for the functions of the constituent elements. All of the functions of the constituent elements may be performed by a CPU or the like. Accordingly, the configurations to be used can be changed appropriately according to technology levels whenever the embodiment is realized.

A computer program for realizing each function of the information processing device according to the above-described embodiment can be created to be mounted on a personal computer or the like. A computer-readable recording medium in which such a computer program is stored can also be supplied. Examples of the recording medium include a magnetic disk, an optical disc, a magneto-optical disc, and a flash memory. The computer program may be delivered via, for example, a network without using a recording medium.

<Flow of Information Processing Method>

Next, the flow of the information processing method performed by the information processing device 2000 according to the embodiment will be described in brief with reference to FIGS. 34 and 35.

[Ray Space Generation Process]

First, the flow up to a ray space generation process will be described with reference to FIG. 34.

The imaged space generation unit 2010 of the information processing device 2000 according to the embodiment acquires the captured data captured by the imaging device 800 and generates the imaged space illustrated in FIG. 33 based on the captured data and the information regarding the imaging position associated with the captured data (step S201).

Next, the ray space generation unit 2020 of the information processing device 2000 first performs a definition loop of the ray L indicated after step S203 using the imaged space generated by the imaged space generation unit 2010. The definition loop of the ray L is performed until the process on all of the pixels (Px, Py) of all of the imaging positions (Cx, Cy, Cz) is completed.

In the definition loop of the ray L, the ray space generation unit 2020 first sets intensity I(Cx, Cy, Cz, Px, Py) in the luminance of each pixel (Px, Py) of the imaging position (Cx, Cy, Cz) (step S205). Subsequently, the ray space generation unit 2020 calculates coordinates (u, v, s, t) of the ray space based on parameters Cx, Cy, Cz, Px, and Py (step S207). Thereafter, the ray space generation unit 2020 sets L(u, v, s, t)=I(Cx, Cy, Cz, Px, Py) (step S209).

When the above-described definition loop of the ray L ends, the ray space generation unit 2020 performs a complementary loop of the ray L indicated after step S211. The complementary loop of the ray L is performed until the process ends for all of the coordinates (u, v, s, t) of the ray space.

In the complementary loop of the ray L, the ray space generation unit 2020 first determines whether L(u, v, s, t) is defined for the coordinates (u, v, s, t) of the ray space of interest (step S213). When L(u, v, s, t) is defined in advance, the ray space generation unit 2020 continues the process of step S213 on other coordinates (u, v, s, t) of the ray space. Conversely, when L(u, v, s, t) is not defined, the ray space generation unit 2020 performs a known complementary process based on the defined L near (u, v, s, t) and calculates L(u, v, s, t) (step S215). Accordingly, L(u, v, s, t) at a ray space position at which L is not defined is complemented based on the defined L(u, v, s, t).

When the above-described complementary loop of the ray L ends, the ray space illustrated in FIG. 32A or 32B is generated.

[Image Reconstruction Process]

Next, the flow of the image reconstruction process will be described with reference to FIG. 35.

The image reconstruction unit 2030 of the information processing device 2000 according to the embodiment first specifies a viewpoint position (Cx, Cy, Cz) and the position (Px, Py) of each pixel included in the image to be reconstructed with reference to information regarding a user manipulation or the like (step S301).

Next, the image reconstruction unit 2030 performs a luminance calculation loop indicated after step S303. The luminance calculation loop is performed until the process ends for all of the pixels (Px, Py) included in the image to be reconstructed.

In the luminance calculation loop, the image reconstruction unit 2030 first calculates the coordinates (u, v, s, t) of the ray space based on the parameters (Cx, Cy, Cz, Px, Py) (step S305). Thereafter, the image reconstruction unit 2030 calculates a pixel value I(Px, Py)=L(Cx, Cy, Cz, Px, Py) of a pixel of interest using L(u, v, s, t) (step S307).

When the above-described complementary loop of the ray L ends, the image at any position and any viewpoint designated by the user manipulation is reconstructed.

The image reconstruction unit 2030 outputs data of the image reconstructed in this way via the display control unit 2040 or the data supply unit 2060 (step S309). Accordingly, the reconstructed image is viewed by the user.

Figure 34:
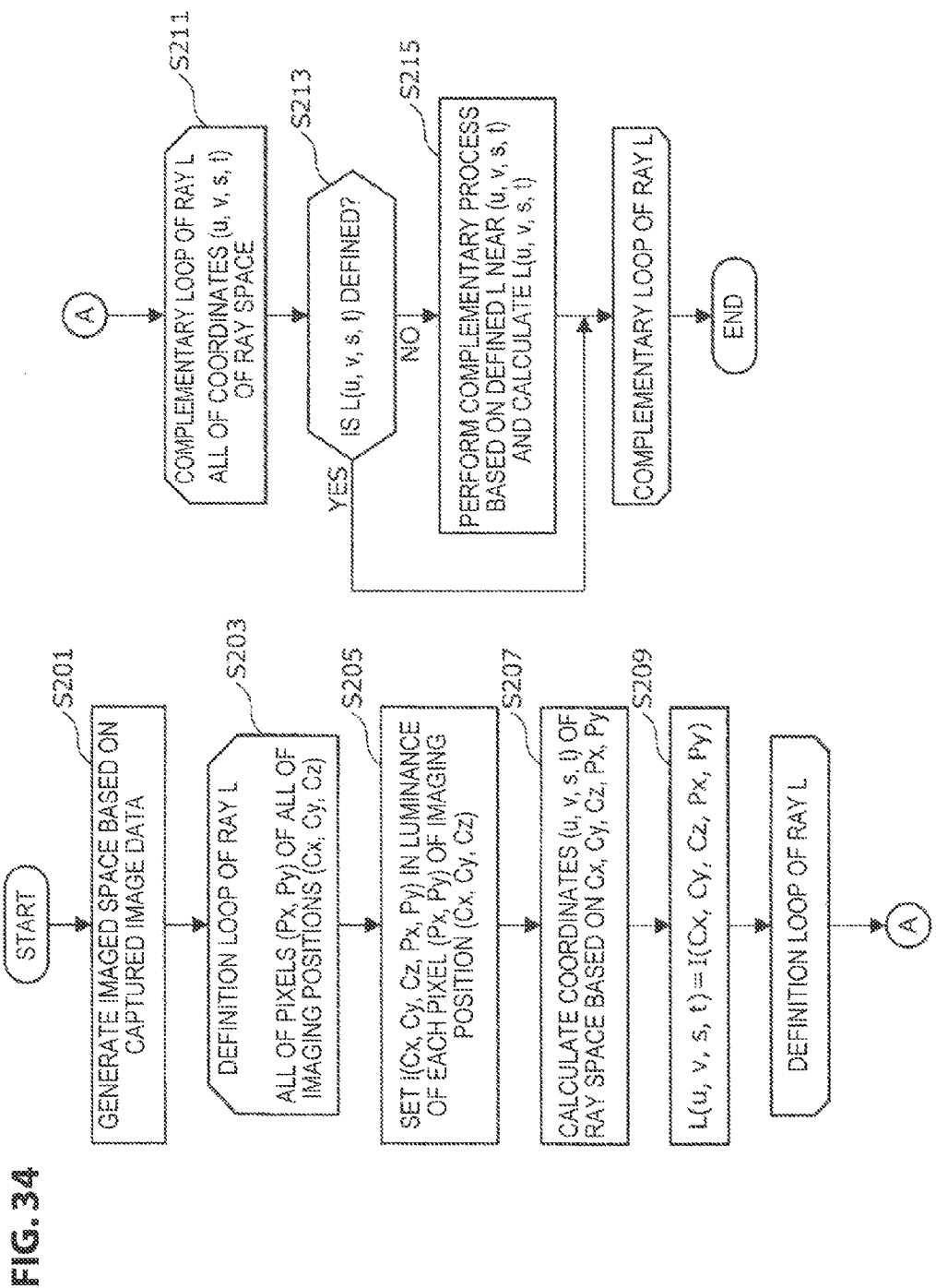
FIG. 34 is a flowchart illustrating a flow example of an information processing method according to the embodiment.

The flow of the information processing method according to the embodiment has been described in brief with reference to FIGS. 34 and 35.

<Conclusion>

In this way, in the information processing device and the information processing method according to the embodiment, a predetermined ray space is generated based on a plurality of pieces of captured-image data captured by an imaging device moving in the space and an image at any viewpoint and in any direction designated by a user is reconstructed based on the generated ray space. In the ray space generated by the information processing device and the information processing method according to the embodiment, all of the rays observed from the inside of the ray space can be described without limiting an observation position or an observation direction. Therefore, it is possible to recombine visual fields without restrictions.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:

a control unit configured to perform control in a manner that a display image generated based on image information which is generated through imaging of an imaging device mounted on a moving object moving in a space, imaging-device posture information which is information regarding a posture of the imaging device, and user view information which is obtained from a user manipulation device manipulated by a user and specifies a region that the user desires to view is displayed in a display region viewed by the user.

(2)

The information processing device according to (1), further including:

an image generation unit configured to generate circumferential captured images which are captured in circumference of a position at which the moving object is present using captured images included in the image information; and an image selection unit configured to select a captured image corresponding to the user view information among the circumferential captured images as a user view image based on the user view information and the circumferential captured images generated by the image generation unit.

(3)

The information processing device according to (2), further including:

an image correction unit configured to perform correction on the circumferential captured image in a manner that a change in the circumferential captured image accompanying a change in a visual line direction of the imaging device is suppressed, based on the imaging-device posture information, when the visual line direction of the imaging device is changed.

(4)

The information processing device according to (3), wherein the image correction unit controls a degree to which the correction is performed according to correction application information indicating an application degree of the correction obtained from the user manipulation device.

(5)

The information processing device according to (4), wherein the image correction unit controls the degree to which the correction is performed for each of rotation coordinate axes mutually independently defined with respect to the imaging device according to the correction application information.

(6)

The information processing device according to any one of (3) to (5), wherein the image correction unit performs correction in a manner that the circumferential captured image after a change in a visual line direction of the moving object is reversely rotated according to a magnitude of a rotation angle accompanying the change in the visual line direction of the imaging device.

(7)

The information processing device according to any one of (3) to (6), wherein the image correction unit performs the correction so that local feature amounts match before and after the change in the visual line direction of the imaging device.

(8)

The information processing device according to any one of (2) to (7), wherein the image generation unit generates, as the circumferential captured image, an omnidirectional image at the position at which the moving object is present or a converted image obtained by converting the omnidirectional image into a rectangular image.

(9)

The information processing device according to any one of (1) to (8), wherein the imaging-device posture information is information regarding rotation of the imaging device.

(10)

The information processing device according to any one of (2) to (9), wherein the user view information is information specifying a display field angle that the user desires to view in the circumferential captured image.

(11)

The information processing device according to (2), further including:

a visual line information generation unit configured to generate visual line information indicating a visual line direction of the imaging device based on the imaging-device posture information, wherein the control unit displays an object indicating the visual line direction of the imaging device indicated with the visual line information along with the user view image using the visual line information generated by the visual line information generation unit.

(12)

The information processing device according to (10) or (11), wherein the control unit generates posture information in which a change in the posture of the imaging device is visualized using rotation information regarding rotation accompanying a change in a visual line direction of the imaging device and calculated based on the imaging-device posture information, and performs control in a manner that the display image is displayed in the display region viewed by the user with the generated posture information superimposed on the display image.

(13)

The information processing device according to (12), further including: an image correction unit configured to perform correction on the circumferential captured image in a manner that a change in the circumferential captured image accompanying the change in the visual line direction of the imaging device is suppressed when the visual line direction of the imaging device is changed without a change in a position of the imaging device, wherein the control unit superimposes an object indicating the posture information on the circumferential captured image corrected by the image correction unit.

(14)

The information processing device according to (13), wherein the control unit superimposes at least one of an object that is rotated with a rotation movement accompanying the change in the visual line direction of the imaging device and an object that is not rotated on the display image.

(15)

The information processing device according to any one of (12) to (14), wherein the control unit visualizes the change in the posture of the imaging device using the rotation information by fixing a motion of a coordinate system fixed to the space in which the imaging device is present and changing the coordinate system fixed to the imaging device or by changing the motion of the coordinate system fixed to the space in which the imaging device is present and fixing the motion of the coordinate system fixed to the imaging device.

(16)

The information processing device according to (15), wherein the control unit generates the display image corresponding to a case in which the space is virtually viewed from a different position from a center of the coordinate system fixed to the space, when visualizing the change in the posture of the imaging device using the rotation information.

(17)

The information processing device according to any one of (12) to (16), wherein the control unit associates an annotation with a correspondence spot of a specific position of the display image in a coordinate system fixed to the space in which the imaging device is present when the annotation is requested to be added to the specific position from the user manipulation device.

(18)

The information processing device according to any one of (12) to (17), wherein, according to the rotation information, the control unit controls at least one of a reproduction speed or a display field angle when the display image is displayed in the display region viewed by the user.

(19)

The information processing device according to any one of (12) to (18), wherein the control unit generates a display image in a case of virtual viewing of the space from an arbitrary position designated from the user manipulation device, centering on the designated arbitrary position.

(20)

The information processing device according to any one of (13) to (19), wherein the control unit changes setting for a correction process in the image correction unit and setting for a superimposition process for the posture information in the control unit based on a manipulation performed on at least one of the imaging device and the user manipulation device.

(21)

The information processing device according to (2), further including:

an image correction unit configured to perform correction on the circumferential captured image in a manner that a change in the circumferential captured image accompanying rotation of the imaging device is suppressed.

(22)

The information processing device according to (21), wherein the control unit controls display of the display image based on a movement direction of the moving object wearing the imaging device.

(23)

The information processing device according to (22), wherein when an angle difference between the movement direction of the moving object and a reference direction of the moving object is within a threshold value, the control unit rotates the display field angle of the display image displayed in the display region viewed by the user at a predetermined speed so that a reference direction in the display image matches the reference direction or the movement direction of the moving object.

(24)

The information processing device according to (23), wherein the predetermined speed is controlled based on at least one of a movement speed and a rotation speed of the moving object.

(25)

The information processing device according to any one of (21) to (24), wherein the user manipulation device is a wearable device which is mounted on the user and in which the display image is displayed, and wherein when a rotation direction of the moving object and a rotation direction of the user manipulation device match, the image correction unit does not perform correction in a manner that the change in the circumferential captured image is suppressed.

(26)

The information processing device according to (25), wherein when rotation amounts of the imaging device and the user manipulation device are equal to or less than a threshold value, the image correction unit performs correction in a manner that the change in the circumferential captured image is suppressed.

(27)

The information processing device according to any one of (1) to (26), wherein the user manipulation device is a wearable device mounted on the user, and wherein the user view information is generated according to a visual line direction of the user detected by the wearable device.

(28)

The information processing device according to any one of (1) to (27), wherein the moving object is one of a human being different from the user manipulating the user manipulation device, a self-propelled object that propels itself in the space, and a flying object that flies in the space.

(29)

The information processing device according to (1), further including:

an acquisition unit configured to acquire intermediate image information generated based on the image information and the imaging-device posture information, wherein the control unit performs control in a manner that the display image generated based on the intermediate image information and the user view information is displayed in the display region viewed by the user.

(30)

An information processing method including:

performing control in a manner that a display image generated based on image information which is generated through imaging of an imaging device mounted on a moving object moving in a space, imaging-device posture information which is information regarding a posture of the imaging device, and user view information which is obtained from a user manipulation device manipulated by a user and specifies a region that the user desires to view is displayed in a display region viewed by the user.

(31)

A program causing a computer to realize a control function of:

performing control in a manner that a display image generated based on image information which is generated through imaging of an imaging device mounted on a moving object moving in a space, imaging-device posture information which is information regarding a posture of the imaging device, and user view information which is obtained from a user manipulation device manipulated by a user and specifies a region that the user desires to view is displayed in a display region viewed by the user.

REFERENCE SIGNS LIST 1000, 1100, 2000 information processing device
1010, 1110 image generation unit
1020, 1120 image selection unit
1030, 1130 image correction unit
1040 moving-object visual line information generation unit
1050, 1150 display control unit
1060, 1160, 2010 data acquisition unit
1070, 1170, 2060 data supply unit
1080, 1180, 2070 storage unit
1190 direction control unit
2020 imaged-space generation unit
2030 ray space generation unit
2040 image reconstruction unit

The invention claimed is:

1. An information processing device comprising:

a control unit configured to perform control in a manner that a display image generated based on image information which is generated through imaging of an imaging device mounted on a moving object moving in a space, imaging-device posture information, and user view information which is obtained from a user manipulation device manipulated by a user and specifies a region that the user desires to view, is displayed in a display region viewed by the user;

an image generation unit configured to generate circumferential captured images which are captured in circumference of a position at which the moving object is present using captured images included in the image information;

an image selection unit configured to select a captured image corresponding to the user view information among the circumferential captured images as a user view image based on the user view information and the circumferential captured images generated by the image generation unit; and an image correction unit configured to perform correction on the circumferential captured image in a manner that a change in the circumferential captured image accompanying a change in a visual line direction of the imaging device is suppressed, based on the imaging-device posture information, when the visual line direction of the imaging device is changed, wherein the image correction unit controls a degree to which the correction is performed according to correction application information obtained from the user manipulation device, and wherein the control unit, the image generation unit, the image selection unit, and the image correction unit are each implemented via at least one processor.

2. The information processing device according to claim 1, wherein the image correction unit controls the degree to which the correction is performed for each of rotation coordinate axes mutually independently defined with respect to the imaging device according to the correction application information.

3. An information processing device comprising:

a control unit configured to perform control in a manner that a display image generated based on image information which is generated through imaging of an imaging device mounted on a moving object moving in a space, imaging-device posture information, and user view information which is obtained from a user manipulation device manipulated by a user and specifies a region that the user desires to view, is displayed in a display region viewed by the user;

an image generation unit configured to generate circumferential captured images which are captured in circumference of a position at which the moving object is present using captured images included in the image information;

an image selection unit configured to select a captured image corresponding to the user view information among the circumferential captured images as a user view image based on the user view information and the circumferential captured images generated by the image generation unit; and a visual line information generation unit configured to generate visual line information indicating a visual line direction of the imaging device based on the imaging-device posture information, wherein the control unit displays an object along with the user view image, the object indicating the visual line direction of the imaging device, and wherein the control unit, the image generation unit, the image selection unit, and the visual line information generation unit are each implemented via at least one processor.

4. An information processing device comprising:

a control unit configured to perform control in a manner that a display image generated based on image information which is generated through imaging of an imaging device mounted on a moving object moving in a space, imaging-device posture information, and user view information which is obtained from a user manipulation device manipulated by a user and specifies a region that the user desires to view, is displayed in a display region viewed by the user;

an image generation unit configured to generate circumferential captured images which are captured in circumference of a position at which the moving object is present using captured images included in the image information; and an image selection unit configured to select a captured image corresponding to the user view information among the circumferential captured images as a user view image based on the user view information and the circumferential captured images generated by the image generation unit, wherein the image generation unit generates, as the circumferential captured image, an omnidirectional image at the position at which the moving object is present or a converted image obtained by converting the omnidirectional image into a rectangular image, wherein the control unit
 generates posture information in which a change in the posture of the imaging device is visualized using rotation information associated with a change in a visual line direction of the imaging device and calculated based on the imaging-device posture information, and
 performs control in a manner that the display image is displayed in the display region viewed by the user with the generated posture information superimposed on the display image, and wherein the control unit, the image generation unit, and the image selection unit are each implemented via at least one processor.

5. The information processing device according to claim 4, further comprising:

an image correction unit configured to perform correction on the circumferential captured image in a manner that a change in the circumferential captured image accompanying the change in the visual line direction of the imaging device is suppressed when the visual line direction of the imaging device is changed without a change in a position of the imaging device, wherein the control unit superimposes an object indicating the posture information on the circumferential captured image corrected by the image correction unit, and wherein the image correction unit is implemented via at least one processor.

6. The information processing device according to claim 5, wherein the control unit superimposes at least one of an object that is rotated with a rotation movement accompanying the change in the visual line direction of the imaging device and an object that is not rotated on the display image.

7. The information processing device according to claim 4, wherein the control unit visualizes the change in the posture of the imaging device using the rotation information, by fixing a motion of a coordinate system fixed to the space in which the imaging device is present and changing the coordinate system fixed to the imaging device, or by changing the motion of the coordinate system fixed to the space in which the imaging device is present and fixing the motion of the coordinate system fixed to the imaging device.

8. The information processing device according to claim 7, wherein the control unit generates the display image corresponding to a case in which the space is virtually viewed from a different position from a center of the coordinate system fixed to the space, when visualizing the change in the posture of the imaging device using the rotation information.

9. The information processing device according to claim 4, wherein the control unit associates an annotation with a correspondence spot of a specific position of the display image in a coordinate system fixed to the space in which the imaging device is present when the annotation is requested to be added to the specific position from the user manipulation device.

10. The information processing device according to claim 4, wherein, according to the rotation information, the control unit controls at least one of a reproduction speed or a display field angle when the display image is displayed in the display region viewed by the user.

11. The information processing device according to claim 4, wherein the control unit generates a display image in a case of virtual viewing of the space from an arbitrary position designated from the user manipulation device, centering on the designated arbitrary position.

12. The information processing device according to claim 5, wherein the control unit changes setting for a correction process in the image correction unit and setting for a superimposition process for the posture information in the control unit based on a manipulation performed on at least one of the imaging device and the user manipulation device.

* * * * *